United States Patent
Kawamoto

(10) Patent No.: US 11,063,438 B2
(45) Date of Patent: Jul. 13, 2021

(54) POWER CONTROL APPARATUS AND POWER CONTROL METHOD

(71) Applicant: SONY CORPORATION, Tokyo (JP)

(72) Inventor: Daisuke Kawamoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/487,364

(22) PCT Filed: Feb. 13, 2018

(86) PCT No.: PCT/JP2018/004902
§ 371 (c)(1),
(2) Date: Aug. 20, 2019

(87) PCT Pub. No.: WO2018/173546
PCT Pub. Date: Sep. 27, 2018

(65) Prior Publication Data
US 2020/0059100 A1    Feb. 20, 2020

(30) Foreign Application Priority Data
Mar. 23, 2017  (JP) .............................. JP2017-057524

(51) Int. Cl.
*H01J 3/38*  (2006.01)
*H02J 1/10*  (2006.01)
(Continued)

(52) U.S. Cl.
CPC .............. *H02J 3/383* (2013.01); *H02J 1/102* (2013.01); *H02J 3/32* (2013.01); *H02J 7/34* (2013.01); *H02M 2001/007* (2013.01)

(58) Field of Classification Search
CPC .... H02J 3/383; H02J 1/102; H02J 3/32; H02J 7/34; H02J 2300/20; H02J 2300/22; H02J 2300/24; H02J 2300/40; H02M 2001/007
See application file for complete search history.

(56) References Cited

U.S. PATENT DOCUMENTS

2016/0248261 A1    8/2016   Tokuda et al.

FOREIGN PATENT DOCUMENTS

| | | |
|---|---|---|
| CN | 105706332 A | 6/2016 |
| EP | 3070813 A1 | 9/2016 |

(Continued)

OTHER PUBLICATIONS

International Search Report and Written Opinion of PCT Application No. PCT/JP2018/004902, dated Mar. 20, 2018, 10 pages of ISRWO.

*Primary Examiner* — Carlos Amaya
(74) *Attorney, Agent, or Firm* — Chip Law Group

(57) ABSTRACT

A power control apparatus capable of stable transition of a set voltage is provided. A power control apparatus includes a DC to DC converter connected to a DC bus line, a communication unit that communicates with another power control apparatus, and a control unit that controls power interchange with the other power control apparatus through the DC bus line, in which the control unit controls at least a control mode and a droop rate, the control mode includes a first mode for controlling a voltage of the DC bus line, a second mode for controlling a current flowing through the DC bus line, and a third mode for stopping the power interchange, and when the control mode is shifted from the first mode to the second mode or the third mode, the control unit controls the droop rate to be set to a predetermined value other than 0%.

14 Claims, 20 Drawing Sheets

(51) Int. Cl.
*H02J 3/32* (2006.01)
*H02J 7/34* (2006.01)
*H02M 1/00* (2006.01)
*H02J 3/38* (2006.01)

(56) References Cited

FOREIGN PATENT DOCUMENTS

| | | |
|---|---|---|
| JP | 2006-288162 A | 10/2006 |
| JP | 2011-205871 A | 10/2011 |
| JP | 2013-090560 A | 5/2013 |
| JP | 2013-207922 A | 10/2013 |
| JP | 2015-204652 A | 11/2015 |
| WO | 2015/072304 A1 | 5/2015 |

POWER CONTROL APPARATUS AND POWER CONTROL METHOD

CROSS REFERENCE TO RELATED APPLICATIONS

This application is a U.S. National Phase of International Patent Application No. PCT/JP2018/004902 filed on Feb. 13, 2018, which claims priority benefit of Japanese Patent Application No. JP 2017-057524 filed in the Japan Patent Office on Mar. 23, 2017. Each of the above-referenced applications is hereby incorporated herein by reference in its entirety.

TECHNICAL FIELD

The present disclosure relates to a power control apparatus, a power control method, and a computer program.

An uninterruptible power supply apparatus that has been known includes a storage battery and can continue supplying power, even when power from the input power supply is interrupted, from the storage battery to devices connected to the apparatus for a predetermined time period without power failure. By expanding such a power supply apparatus on customer basis, a technology for supplying power to customers, for example, when abnormality such as power failure occurs in the power supplied from a commercial power source has been proposed (see Patent Documents 1, 2, and the like).

CITATION LIST

Patent Document

Patent Document 1: Japanese Patent Application Laid-Open No. 2011-205871
Patent Document 2: Japanese Patent Application Laid-Open No. 2013-90560

SUMMARY OF THE INVENTION

Problems to be Solved by the Invention

In a system for interchanging power among consumers via a direct current (DC) power line, a DC to DC converter that controls the voltage of the power line is required to continuously interchange power among a plurality of DC to DC converters. When the power supply from one DC to DC converter is terminated and control of the voltage of the power line is transferred to another DC to DC converter, a stable transition of voltage control right is required.

Therefore, the present disclosure proposes a new and improved power control apparatus, a power control method, and a computer program capable of stably shifting a voltage control right when power is supplied between consumers via a DC power line.

Solution to Problems

According to the present disclosure, there is provided a power control apparatus including a DC to DC converter connected by a DC bus line, a communication unit that communicates with another power control apparatus, and a control unit that controls power interchange via the DC bus line to the other power control apparatus, in which the control unit at least controls a control mode and a droop rate, the control mode includes a first mode that controls a voltage of the DC bus line, a second mode for controlling the current flowing through the DC bus line, and a third mode for stopping the power interchange, and when the control mode is shifted from the first mode to the second mode or the third mode, the control unit controls the droop rate to be set to a predetermined value other than 0%.

Furthermore, according to the present disclosure, there is provided a power control apparatus including a DC to DC converter connected to a DC bus line, a communication unit that communicates with another power control apparatus, and a control unit that controls power interchange via the DC bus line with the other power control apparatus, in which the control unit at least controls a control mode and a droop rate, the control mode includes a first mode for controlling a voltage of the DC bus line, a second mode for controlling the current flowing through the DC bus line, and a third mode for stopping the power interchange, and when the control mode is shifted from the second mode or the third mode to the first mode, the control unit controls the droop rate to be set to a predetermined value other than 0%.

Furthermore, according to the present disclosure, there is provided a power control method causing a processor to execute: controlling power interchange via a DC to DC converter connected to a direct current (DC) bus line with another power control apparatus through the DC bus line, controlling a control mode including a first mode for controlling a voltage of the DC bus line, a second mode for controlling a current flowing through the DC bus line, and a third mode for stopping the power interchange, and controlling a droop rate of the DC to DC converter, in which when the control mode is shifted from the first mode to the second mode or the third mode, the droop rate is set to a predetermined value other than 0% and then switched to 0%.

Furthermore, according to the present disclosure, there is provided a power control method causing a processor to execute: controlling power interchange via a DC to DC converter connected to a direct current (DC) bus line with another power control apparatus through the DC bus line, controlling a control mode including a first mode for controlling a voltage of the DC bus line, a second mode for controlling a current flowing through the DC bus line, and a third mode for stopping the power interchange, and controlling a droop rate of the DC to DC converter, in which when the control mode is shifted from the second mode or the third mode to the first mode, the droop rate is set to a predetermined value other than 0% and then switched to 0%.

Furthermore, according to the present disclosure, there is provided a computer program causing a processor to execute: controlling power interchange via a DC to DC converter connected to a direct current (DC) bus line with another power control apparatus through the DC bus line, controlling a control mode including a first mode for controlling a voltage of the DC bus line, a second mode for controlling a current flowing through the DC bus line, and a third mode for stopping the power interchange, and controlling a droop rate of the DC to DC converter, in which when the control mode is shifted from the first mode to the second mode or the third mode, the droop rate is set to a predetermined value other than 0% and then switched to 0%.

Furthermore, according to the present disclosure, there is provided a computer program causing a processor to execute: controlling power interchange via a DC to DC converter connected to a direct current (DC) bus line with another power control apparatus through the DC bus line, controlling a control mode including a first mode for controlling a voltage of the DC bus line, a second mode for controlling a current flowing through the DC bus line, and a third mode for stopping the power interchange, and controlling a droop rate of the DC to DC converter, in which when the control mode is shifted from the second mode or the third mode to the first mode, the droop rate is set to a predetermined value other than 0% and then switched to 0%.

Effects of the Invention

As described above, according to the present disclosure, a power control apparatus, a power control method, and a computer program which are new and improved and capable of stable transition of voltage control right when power is supplied between consumers via a DC power line are provided.

Note that the above-described effect is not necessarily limited, and it is also possible to use any one of the effects illustrated in this specification together with or in place of the above-mentioned effect, or other effects that can be grasped from this specification.

MODE FOR CARRYING OUT THE INVENTION

Figure 1:
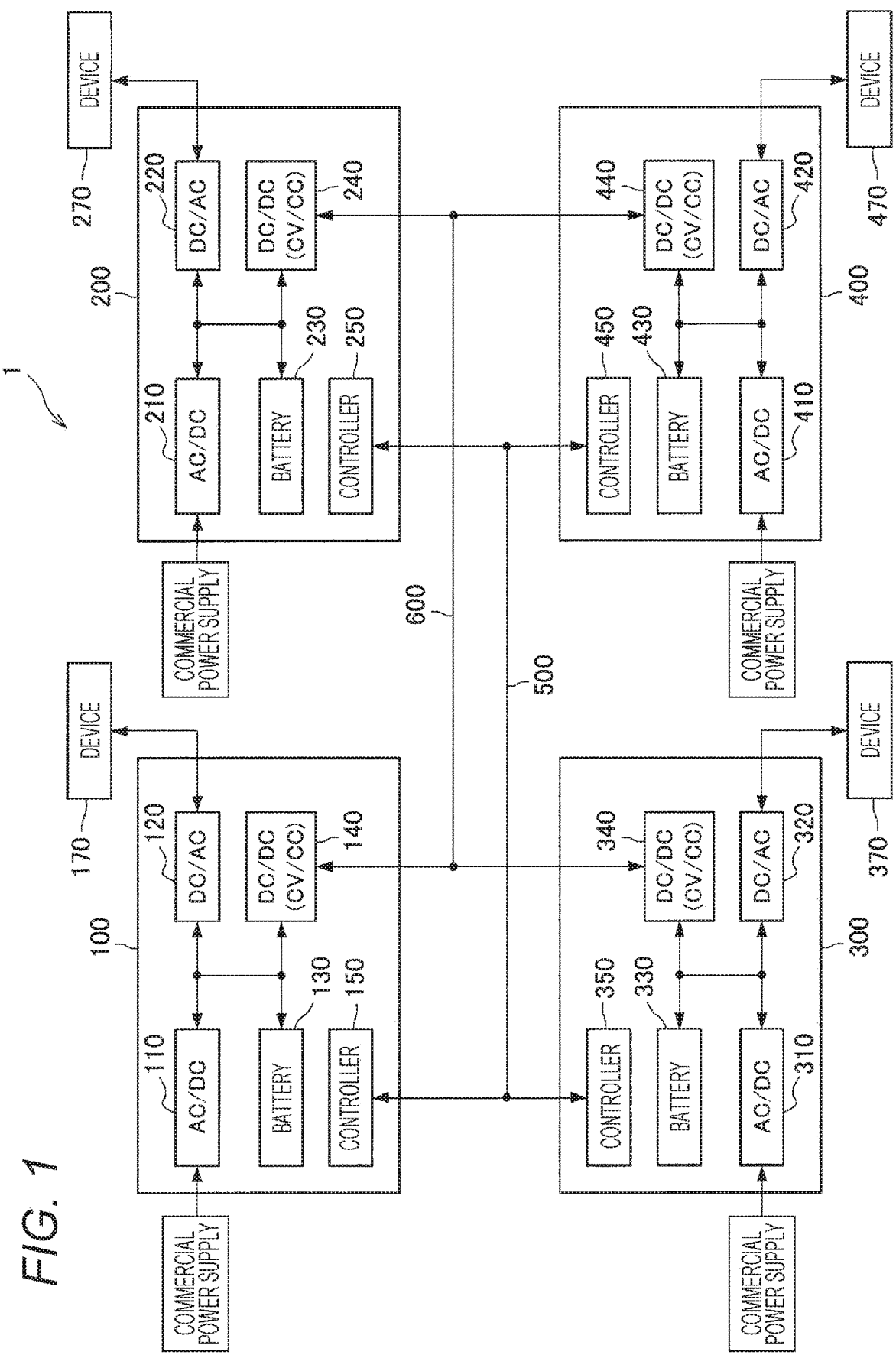
FIG. 1 is an explanatory diagram illustrating a configuration example of a power supply system according to an embodiment of the present disclosure.

Preferred embodiments of the present disclosure will be described in detail below with reference to the accompanying drawings. Note that, in the present specification and the accompanying drawings, the same reference numerals are given to constituent elements having substantially the same functional configuration to eliminate redundant explanation.

Note that the description will be given in the following order:
1. Embodiment of Present Disclosure
1.1 Configuration Example
1.2. Operation Example
2. Summary
<1. Embodiment of Present Disclosure>
[1.1 Configuration Example]

First, a configuration example of a power supply system including a power supply apparatus according to an embodiment of the present disclosure will be described with reference to the drawings. FIG. 1 is an explanatory diagram illustrating a configuration example of a power supply system according to an embodiment of the present disclosure. Hereinafter, a configuration example of a power supply system according to the embodiment of the present disclosure will be described using FIG. 1.

A power supply system 1 according to the embodiment of the present disclosure illustrated in FIG. 1 is a system that interchanges power via a direct current (DC) bus line. As illustrated in FIG. 1, a power supply system 1 according to an embodiment of the present disclosure includes power supply apparatuses 100, 200, 300, and 400. The power supply apparatuses 100, 200, 300, and 400 are mutually connected by a communication line 500 and a DC bus line 600, respectively.

The power supply apparatuses 100, 200, 300, and 400 each include a battery inside or outside of the apparatus and is provided as an example of the power control apparatus of the present disclosure. For example, such an apparatus is installed at home, in a business office, or the like. In the present embodiment, the power supply apparatuses 100, 200, 300, and 400 all include batteries 130, 230, 330, and 430, respectively, inside the apparatuses. The power supply apparatuses 100, 200, 300, and 400 store power in the batteries 130, 230, 330, 430, respectively, and the batteries 130, 230, 330, 430 storing power can supply power to devices connected to the power supply apparatuses 100, 200, 300, and 400.

The power supply apparatuses 100, 200, 300, and 400 according to the present embodiment can supply power stored in the batteries 130, 230, 330, and 430, respectively, to devices 170, 270, 370, and 470 which are connected to the power supply apparatuses, when, for example, the power supply from the commercial power source is interrupted, thus preventing interruption of power supply to the power consuming devices 170, 270, 370, and 470. Examples of power consuming devices 170, 270, 370, and 470 include, for example, home appliances, such as air conditioners, refrigerators, televisions, or personal computers (PCs), and may also include electric-powered vehicles such as electric cars.

Note that FIG. 1 illustrates a case where one apparatus is connected to one power supply apparatus, but the present disclosure is not limited to this example. Alternatively, a plurality of devices that consume power may be connected to one power supply apparatus.

The power supply apparatuses 100, 200, 300, and 400 have a power receiving function to receive power from other power supply apparatuses through the DC bus line 600 when the power supply from the commercial power source is interrupted and the power stored in the battery does not exceed a predetermined amount, and a power supplying function to supply power to other power supply apparatuses via the DC bus line 600.

Among the power supply apparatuses 100, 200, 300, and 400 illustrated in FIG. 1, the power supply apparatus 100 is taken as an example to explain a functional configuration example of the power supply apparatuses 100, 200, 300, and 400. As illustrated in FIG. 1, the power supply apparatus 100 according to the embodiment of the present disclosure includes an AC to DC converter 110, a DC to AC converter 120, a battery 130, a DC to DC converter 140, and a controller 150.

The AC to DC converter 110 converts AC power supplied from a commercial power source into DC power. The AC to DC converter 110 outputs DC power converted from AC power to the DC to AC converter 120, the battery 130, and the DC to DC converter 140.

The DC to AC converter 120 converts the DC power into AC power and supplies the AC power to the device 170 connected to the power supply apparatus 100. A power source of AC power supplied from the power supply apparatus 100 to the device 170 is a commercial power source or a battery 130.

The battery 130 is a storage battery capable of charging and discharging, and has a sufficient capacity to supply power for a predetermined time period to the device 170 even when, for example, the power supply from a commercial power source is interrupted. The power supply apparatus 100 operates to switch to the power supply from the battery 130 to supply power to the device 170 when the power supply from the commercial power source is interrupted. The battery 130 can store DC power converted by the AC to DC converter 110, and may store DC power generated by renewable energy such as, for example, solar power generation or wind power generation.

The DC to DC converter 140 converts the DC power converted by the AC to DC converter 110 or the DC power supplied from the battery 130 into DC power which can be output to the DC bus line 600. The conversion to DC power that can be output to the DC bus line 600 will be described in detail later.

The controller 150 controls the operation of the power supply apparatus 100. In the present embodiment, when the power supply from the commercial power source to the power supply apparatus 100 is interrupted and the capacity of the battery 130 does not exceed the predetermined amount, the controller 150 controls the operation of the power supply apparatus 100 to request power supply to the other power supply apparatuses 200, 300, and 400 to the DC bus line 600 through the communication line 500.

Further, in the present embodiment, when the power supply to the other power supply apparatuses 200, 300, and 400 is interrupted and the capacities of the batteries 230, 330, and 430 do not exceed the predetermined amount, the request for power supply to the DC bus line 600 sent from the power supply apparatus 200, 300, or 400 is received via the communication line 500, and the controller 150 controls the operation of the power supply apparatus 100 to supply power to the power supply apparatus 200, 300, or 400 that has transmitted the request for power supply, if the power supply is possible, via the DC bus line 600.

In controlling the operation of the power supply apparatus 100 to supply power through the DC bus line 600, the controller 150 changes its operation depending on whether or not the other power supply apparatuses 200, 300, and 400 have obtained a control right of the DC bus line 600. The control right of the DC bus line 600 refers to the right to set the voltage of the DC bus line 600. The controller 150 controls the operation of the power supply apparatus 100 to supply power through the DC bus line 600 so as not to exceed the rating of the DC bus line 600.

If the other power supply apparatuses 200, 300, and 400 have not obtained the control right of the DC bus line 600, the controller 150 notifies the other power supply apparatuses 200, 300, and 400 that the controller 150 has obtained the control right of the DC bus line 600 and controls the operation of the power supply apparatus 100 to supply power through the DC bus line 600.

On the other hand, if any one of the other power supply apparatus 200, 300, and 400 has obtained the control right of the DC bus line 600, the controller 150 controls the operation of the power supply apparatus 100 to supply power through the DC bus line 600 on the premise that any one of the other power supply apparatuses 200, 300, and 400 has obtained the control right of the DC bus line 600.

The power supply apparatuses 100, 200, 300, and 400 operate by switching a control mode including at least three states when interchanging power via the DC to DC converters 140, 240, 340, and 440. The control mode controls the state of the DC to DC converters. In the present embodiment, the control mode in which the control right of the DC bus line 600 is obtained is referred to as a voltage mode, and the control mode in which the current is sent to or received from the DC bus line 600 is referred to as a current mode. Furthermore, the control mode in which the control right of the DC bus line 600 is not obtained and the power interchange to and from the DC bus line 600 is not performed is referred to as a stop mode.

The controller 150 may determine the possibility of power supply using information such as the amount of power stored in the battery 130, an estimated power consumption of the device 170 in the near future, and a prediction of storage amount of the battery 130 in the near future. Furthermore, the controller 150 may determine the possibility of power supply on the basis of the priority of the power supply apparatus that has requested the power supply.

The other power supply apparatuses 200, 300, and 400 are configured similarly to the power supply apparatus 100. In other words, the power supply apparatus 200 according to the embodiment of the present disclosure includes an AC to DC converter 210, a DC to AC converter 220, a battery 230, a DC to DC converter 240, and a controller 250. The power supply apparatus 300 according to the embodiment of the present disclosure includes an AC to DC converter 310, a DC to AC converter 320, a battery 330, a DC to DC converter 340, and a controller 350. The power supply apparatus 400 according to the embodiment of the present disclosure includes an AC to DC converter 410, a DC to AC converter 420, a battery 430, a DC to DC converter 440, and a controller 450.

The configuration example of the power supply system 1 according to the embodiment of the present disclosure has been described above using FIG. 1. Subsequently, an example of a functional configuration of the controller 150 included in the power supply apparatus 100 according to the embodiment of the present disclosure will be described.

Figure 2:
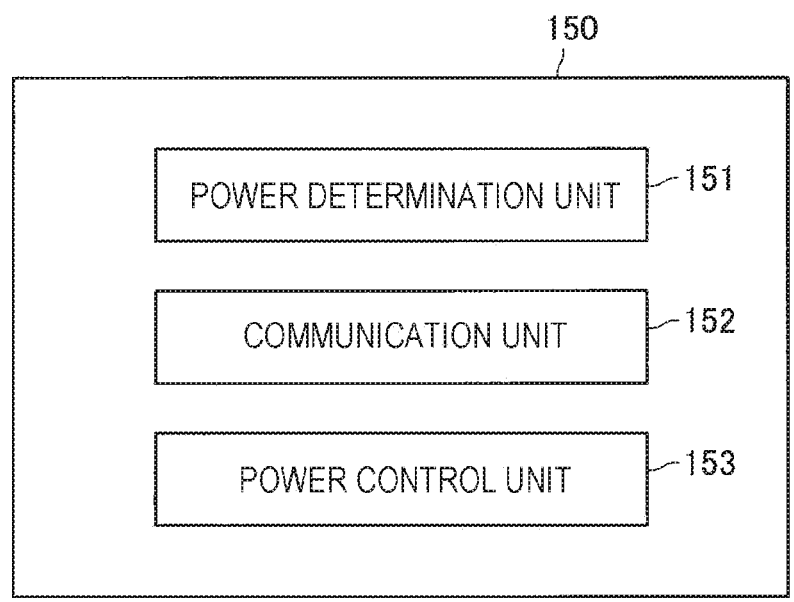
FIG. 2 is an explanatory diagram illustrating an example of a functional configuration of a controller included in the power supply apparatus according to the embodiment.

FIG. 2 is an explanatory diagram illustrating an example of a functional configuration of the controller 150 included in the power supply apparatus 100 according to the embodiment of the present disclosure. Hereinafter, the example of the functional configuration of the controller 150 included in the power supply apparatus 100 according to the embodiment of the present disclosure will be described with reference to FIG. 2.

As illustrated in FIG. 2, the controller 150 includes a power determination unit 151, a communication unit 152, and a power control unit 153.

The power determination unit 151 determines, for example, whether or not the power supply from the commercial power source to the power supply apparatus 100 is interrupted. The power determination unit 151 determines the presence or absence of the occurrence of the interruption of the power supply from the commercial power source, for example, by detecting a voltage value of a predetermined power line. Furthermore, when the power supply from the commercial power source is interrupted, the power determination unit 151 determines, for example, whether the capacity of the battery 130 does not exceed a predetermined amount in accordance with the power supply from the battery 130 to the device 170. The power determination unit 151 causes the communication unit 152 to transmit a request for power supply through the communication line 500 when it is determined that the capacity of battery 130 has decreased to or smaller than a predetermined amount because of, for example, the occurrence of interruption of the power supply from the commercial power source. Furthermore, when the request for power supply is transmitted from the other power supply apparatuses 200, 300, and 400, the power determination unit 151 determines whether or not the power supply is possible to the apparatus that has transmitted the request for power supply. When the power supply is possible to the apparatus that has transmitted the request for power supply, the communication unit 152 is operated to return a response to the apparatus in question as a candidate apparatus for supplying power through the communication line 500.

The communication unit 152 transmits various kinds of information associated with the transmission and reception of power through the communication line 500. Furthermore, the communication unit 152 receives various kinds of information associated with the transmission and reception of power through the communication line 500.

If the power determination unit 151 determines that the power supply from the commercial power source is interrupted and the capacity of the battery 130 has decreased to or smaller than a predetermined amount, the communication unit 152 transmits the request for power supply to other power supply apparatuses 200, 300, and 400 through the communication line 500. Furthermore, the communication unit 152 selects the power supply apparatus according to the permission of the power supply from other power supply apparatuses 200, 300, and 400, and notifies the selected power supply apparatus that the power supply apparatus is selected as a supplier of power through the communication line 500.

Furthermore, the communication unit 152 receives the request for power supply from other power supply apparatuses 200, 300, and 400 when it is determined that the power supply from the commercial power source is interrupted and the battery capacity is reduced to or smaller than a predetermined amount.

When the request for power supply is transmitted from the other power supply apparatus 200, 300, or 400, and the power determination unit 151 determines that the power supply to the apparatus in question is possible, the communication unit 152 then transmits information to reply to the apparatus in question as the candidate apparatus for supplying power. In the response, the communication unit 152 may include, for example, information such as a power supply fee, a lead time before the start of supply, available time for power supply, past supply record to the apparatus that has requested the power supply, and so on. By transmitting information from the communication unit 152 as the candidate for supplying power to respond to the apparatus in question, the power supply apparatus 200, 300, or 400 that receives the response can determine the candidate for power supply on the basis of the information.

The request for power supply transmitted when the power supply from the commercial power source is interrupted and the capacity of the battery 130 is reduced to or smaller than a predetermined amount includes, for example, a required power amount, a time zone in which the power supply is desired, information associated with the desired cost, past power reception results, and so on. And the response to the power supply may include, for example, the amount of power that can be supplied, the time for which power can be transmitted, information associated with the cost of the power, past supply history of the device that has requested the power supply, and so on. When the power supply apparatuses 100, 200, 300, and 400 interchange power via the DC bus line 600, they can determine the source and destination of power supply, the supplying time, and so on by exchanging the information.

Note that the information transmitted by the communication unit 152 or the information received may be encrypted. The communication unit 152 may execute the encryption of the information and the decryption of the encrypted information. For encryption of information, for example, an encryption method such as a common key encryption method or a public key encryption method may be used.

By encrypting the information transmitted from and received by the communication unit 152, it is possible to avoid the inconvenience due to tapping of information by a malicious third party. Furthermore, before transmitting or receiving information from and by the communication unit 152, an authentication processing with the opponent may be performed in advance. By performing the authentication processing with the opponent in advance, it is possible to avoid inconvenience due to impersonation and the like. Note that, needless to say, the encryption and the authentication are not limited to specific methods.

The power control unit 153 controls the transmission of power from the DC to DC converter 140 through the DC bus line 600 and the reception of power by the DC to DC converter 140. Control of power transmission and reception by the power control unit 153 is performed on the basis of information transmitted from or received by the communication unit 152.

Furthermore, when the power supply is transmitted from another power supply apparatus, the power control unit 153 may determine whether or not the power supply is possible using information such as the amount of power stored in the battery 130, the prediction of power consumption of the device 170 in the near future, and so on.

Although FIG. 2 illustrates an example of the functional configuration of the controller 150 included in the power supply apparatus 100, the controller 250 included in the power supply apparatus 200, the controller 350 included in the power supply apparatus 300, and the controller 450 in the power supply apparatus 400 are configured similarly to the configuration illustrated in FIG. 2. Furthermore, the controller 150 may be formed by a plurality of different controllers, such as, for example, a power control processor and a communication processor. Moreover, the functions or part of the functions of the power determination unit 151, the communication unit 152, and the power control unit 153 may be used to implement the controller.

The example of the functional configuration of the controller 150 included in the power supply apparatus 100 according to the embodiment of the present disclosure has been described above by with reference to FIG. 2. Subsequently, an operation example of the power supply system 1 according to the embodiment of the present disclosure will be described.

[1.2. Operation Example]

First, how the embodiment of the present disclosure has been achieved is described using the power supply system 1 according to the embodiment of the present disclosure illustrated in FIG. 1.

In a system such as the system illustrated in FIG. 1 that achieves one-to-one (Peer to Peer; P2P) power interchange by sharing the DC bus line 600, the DC to DC converter that always operates in the voltage mode is required in the plurality of DC to DC converters connected to the DC bus line 600 to continuously interchange power by the plurality of DC to DC converters.

This condition may be satisfied by, for example, a method of continuing the operation of the DC to DC converter in the voltage mode after the power interchange of the DC to DC converter is completed as long as other power interchange continues. In this method, the power consumption of the battery connected to the DC to DC converter is consumed in order to continue the operation in the voltage mode, although the power interchange is ended.

On the other hand, there is a method in which, when the power interchange of the DC to DC converter in the voltage mode is finished, the total power interchange of the DC bus line 600 is ended (stopped) once, and the power interchange which is desired to be continued, may be restarted. It takes time in this method for the stop processing and also for the start processing of the power interchange, thus lowering the utilization efficiency of the DC bus line 600.

Furthermore, there is a method in which, when the power interchange of the DC to DC converter in the voltage mode is finished, the voltage control right of the DC bus line 600 is transferred by switching and operating another DC to DC converter that continues the power interchange to the voltage mode. However, this results in two DC to DC converters in the voltage mode being present temporarily in the transfer of the voltage control right to the other DC to DC converter. If, during this time, the DC bus line 600 is not set to a target voltage due to the voltage drop by wiring resistance of the DC bus line 600 or influence by a setting value error of the device, the DC to DC converter would keep flowing the current until the current limit value is reached.

Figure 3:
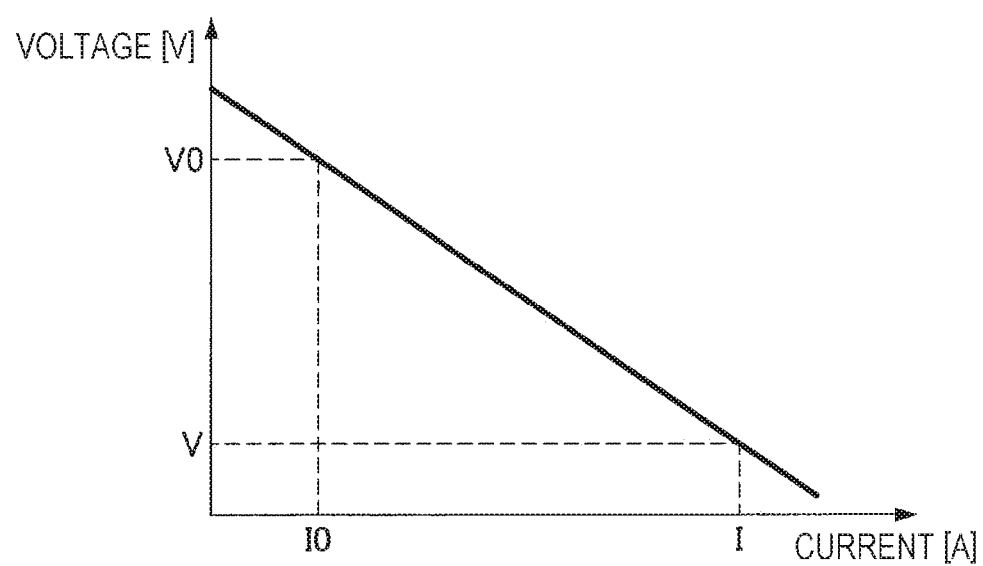
FIG. 3 is an explanatory diagram for explaining about the existing droop control.

FIG. 3 is an explanatory diagram for describing the existing droop control. FIG. 3 is a graph in which the horizontal axis represents the current flowing through the DC bus line 600, and the vertical axis represents the voltage of the DC bus line 600. In the graph illustrated in FIG. 3, the voltage becomes $V\_0$ at the reference load (current $I\_0$), but when the load increases and the current becomes I, the voltage of the DC bus line 600 drops to V. By this control, when two voltage sources are operated in parallel, for example, when the current from one voltage source increases, the voltage drops, and, as a result, the current flows from another voltage source. By operating the voltage source in this way, a large current cannot flow from one voltage source, and the current can be balanced passively. As described above, since the balance of the current is determined passively in the droop control, it is necessary to combine another method to achieve, for example, the P2P power interchange in which an actively determined amount of power is transmitted from one battery to another battery. Preferred embodiments of the present disclosure that achieve the active P2P power interchange using the droop control will be described later as second and third embodiments.

First Embodiment

Active P2P power interchange can be achieved between DC to DC converters connected to the DC bus line 600 without using droop control. The present embodiment can adopt a method in which, among the DC to DC converters connected to the DC bus line 600, one DC to DC converter is operated in the voltage mode to keep a constant voltage in the DC bus line 600, and the other DC to DC converters are operated in the current mode to control the current flowing through the DC bus line 600.

Figure 4:
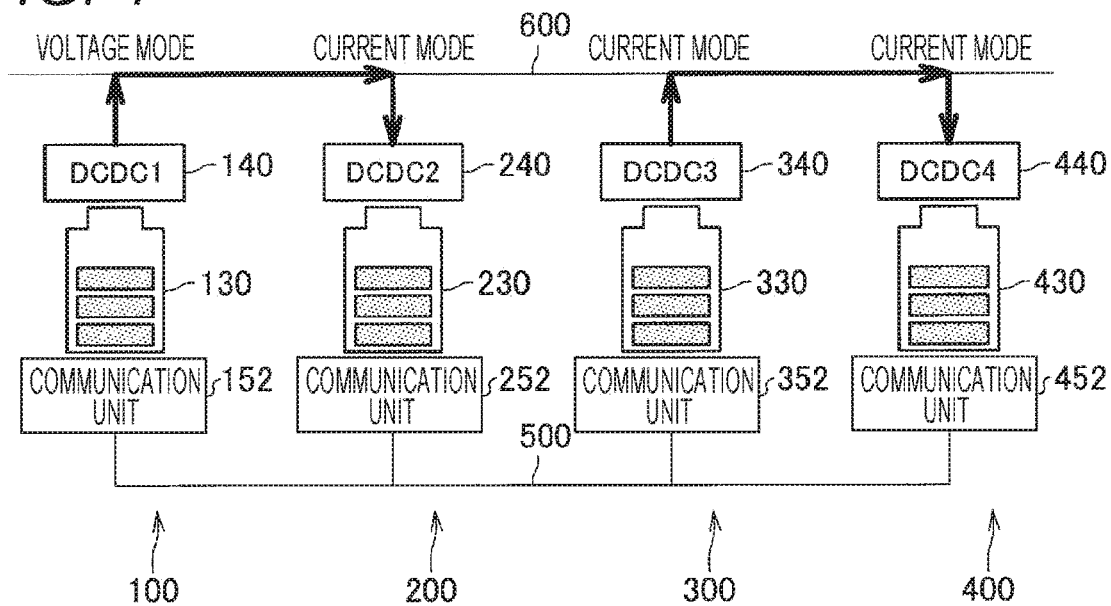
FIG. 4 is an explanatory diagram for explaining P2P power interchange using a direct current (DC) bus line.

FIG. 4 is an explanatory diagram for describing the P2P active power interchange using the DC bus line 600. For example, the DC to DC converter 140 of the power supply apparatus 100 is operated in the voltage mode, while the DC to DC converters 240, 340, and 440 of the other power supply apparatuses 200, 300, and 400, respectively, are operated in the current mode. This method can achieve the power interchange of fixed quantity by keeping a constant voltage in the DC bus line 600 by the DC to DC converter in the voltage mode without using the droop control. Note that, in FIG. 4 and the drawings subsequent to FIG. 4, the DC to DC converter 140 is indicated as "DCDC1", the DC to DC converter 240 is indicated as "DCDC2", the DC to DC converter 340 is indicated as "DCDC3", and the DC to DC converter 440 is indicated as "DCDC4".

This method is characterized in that only the DC to DC converter participating in the power interchange is operating and, when the power interchange is completed, the DC to DC converter stops its operation to improve power efficiency. On the other hand, in the present embodiment, when stopping the operation of the DC to DC converter of the power supply apparatus in the voltage mode, it is necessary to transfer the voltage control right of the DC bus line 600 to another power supply apparatus, so that the operation of the system may be unstable during the transfer. This should be considered during implementation.

Figure 5:
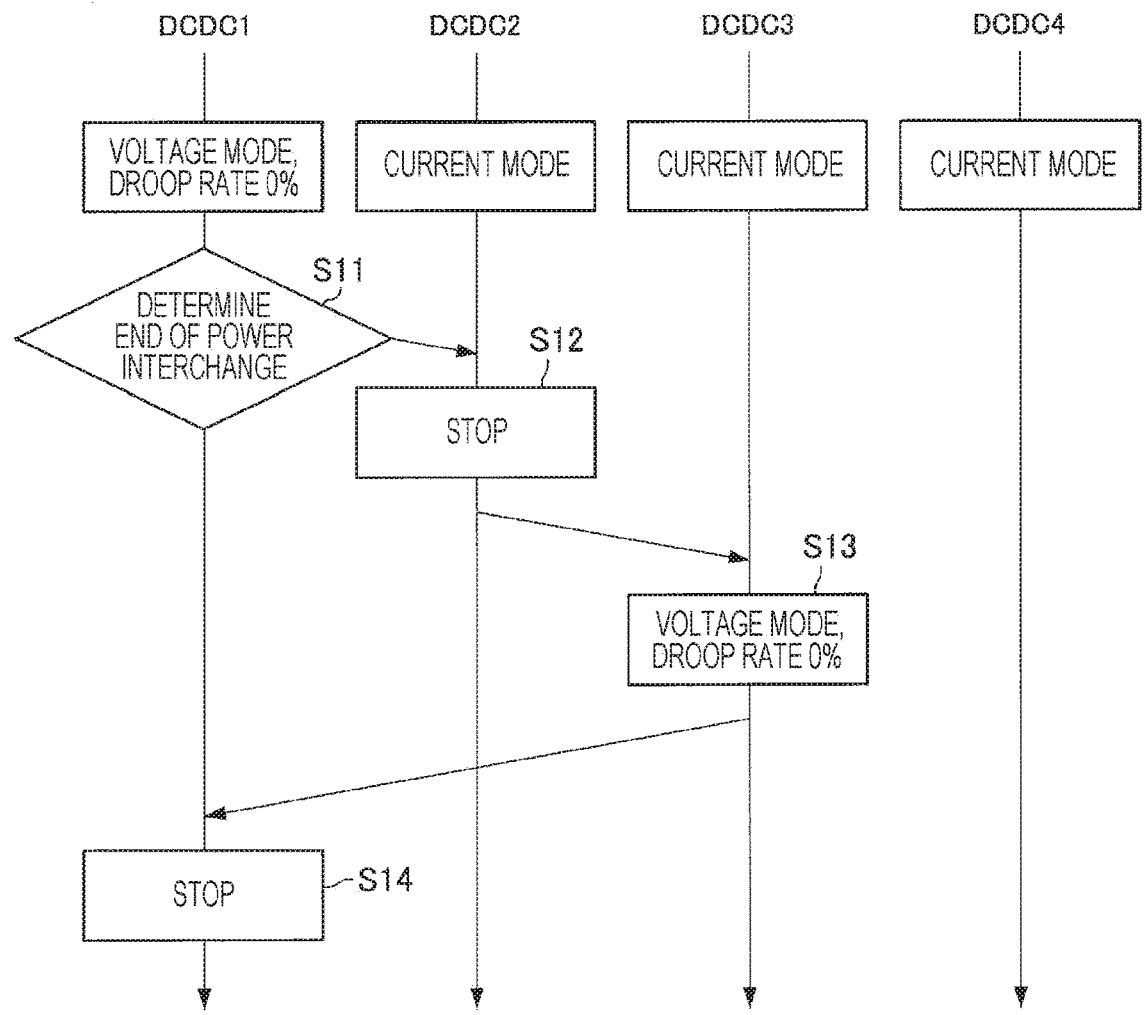
FIG. 5 is a flowchart illustrating an operation example of a DC to DC converter of a power supply apparatus.
Figure 6A:
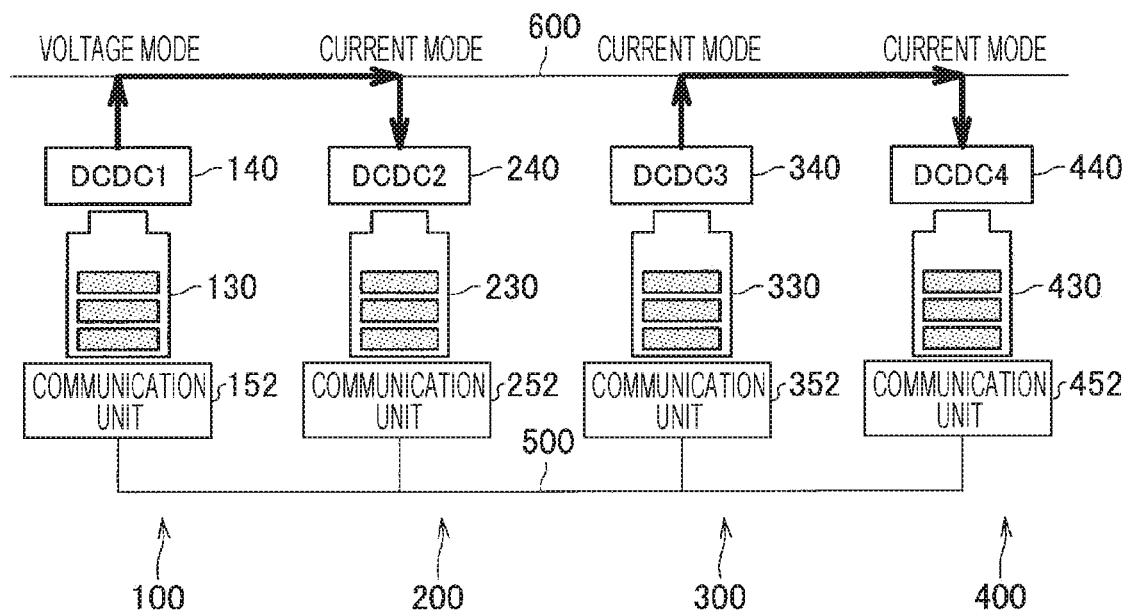
FIG. 6A is an explanatory diagram illustrating a state of the DC to DC converter.

FIG. 5 is a flowchart illustrating an operation example of the DC to DC converter of the power supply apparatuses. Furthermore, FIGS. 6A, 6B, 6C, and 6D are explanatory diagrams illustrating the states of the power supply apparatuses corresponding to the individual operations in the operation example illustrated in FIG. 5. In the example of FIG. 5, the control mode of the power supply apparatus 100 is the voltage mode that operates without the droop control (droop rate 0%), and the control mode of all power supply apparatuses 200, 300, 400 is the current mode. FIG. 6A illustrates that the control mode of the power supply apparatus 100 is the voltage mode, the power supply apparatus 100 operates without performing the droop control (droop rate 0%), and the control mode of the power supply apparatuses 200, 300, and 400 operate in the current mode. Furthermore, in this example, the power interchange is performed from the DC to DC converter 140 to the DC to DC converter 240 according to a predetermined agreement between the power supply apparatuses 100 and 200, and the power interchange is performed from the DC to DC converter 340 to the DC to DC converter 440 according to an agreement between the power supply apparatuses 300 and 400.

Figure 6B:
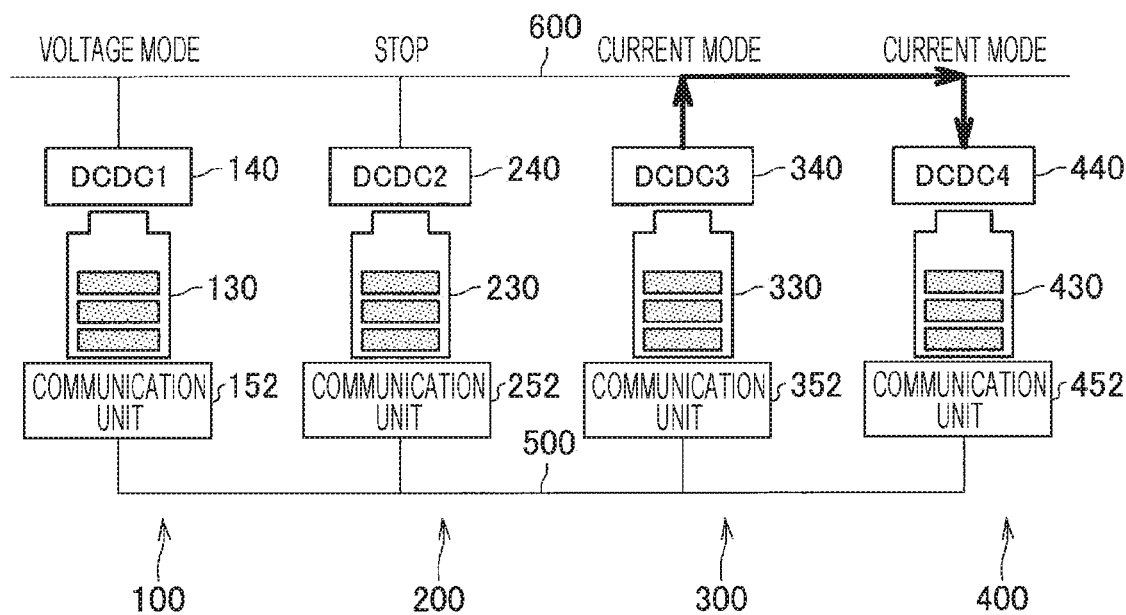
FIG. 6B is an explanatory diagram illustrating a state of the DC to DC converter.

For example, when the power interchange is performed from the DC to DC converter 140 to the DC to DC converter 240, the power control unit 153 determines whether a predetermined power interchange end condition is satisfied (step S11). If the predetermined power interchange end condition is satisfied, the power supply apparatus 100 transmits a request to stop the power interchange to the power supply apparatus 200. The power supply apparatus 200 shifts the control mode to the stop mode on the basis of reception of the request to stop the power interchange (step S12). FIG. 6B illustrates that the control mode of the power supply apparatus 200 has shifted to the stop mode.

Figure 6C:
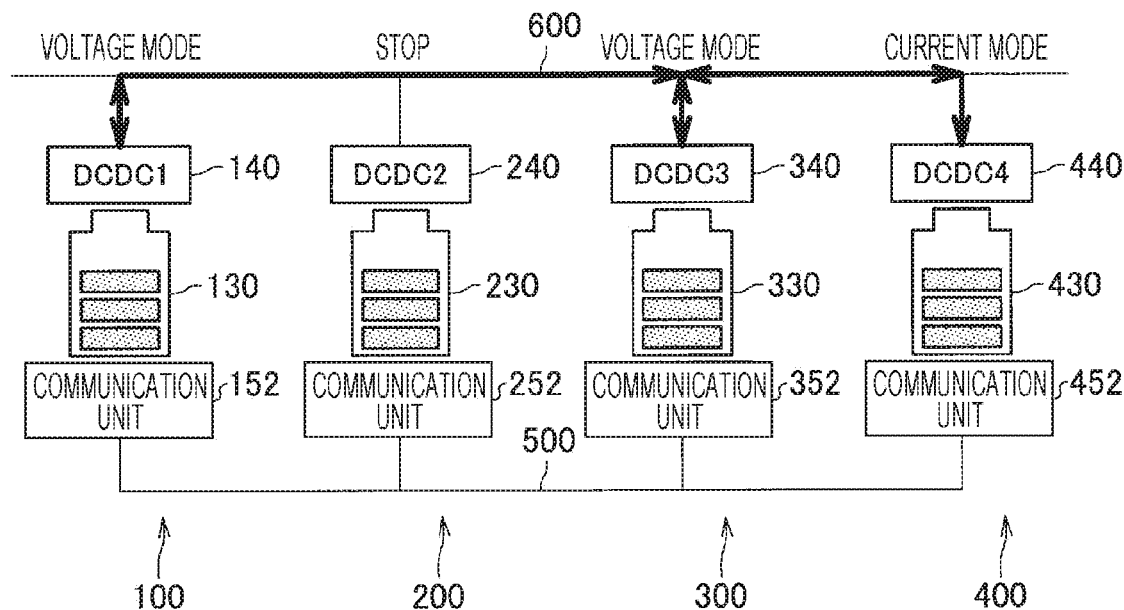
FIG. 6C is an explanatory diagram illustrating a state of the DC to DC converter.
Figure 6D:
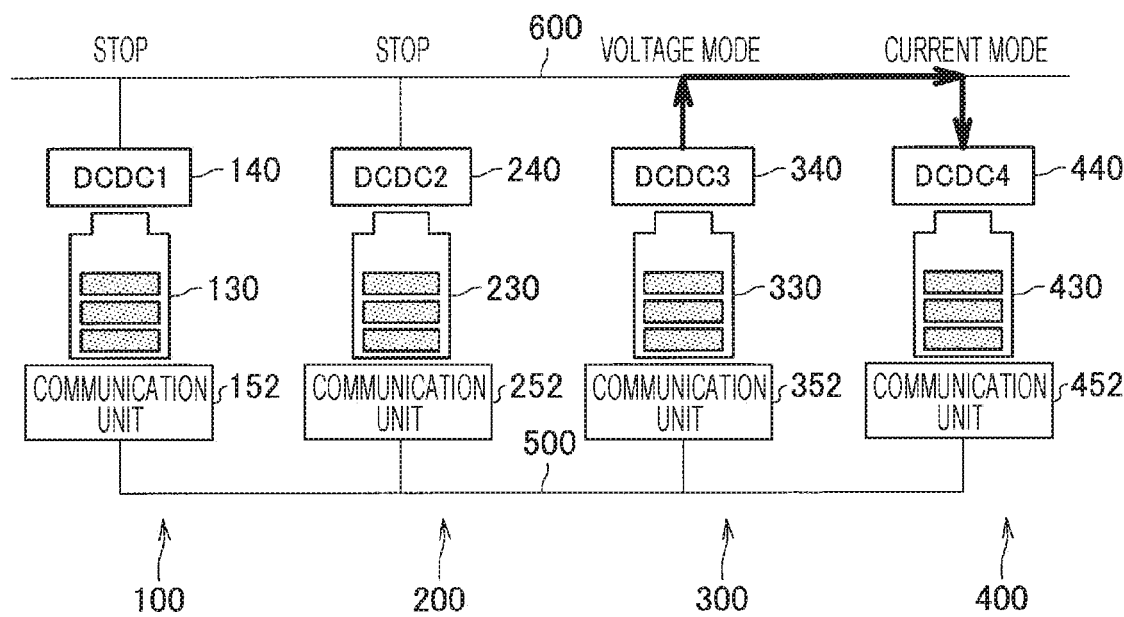
FIG. 6D is an explanatory diagram illustrating a state of the DC to DC converter.

Thereafter, in order to transfer the control right of the DC bus line 600 from the DC to DC converter 140 to the DC to DC converter 340, the control mode of the power supply apparatus 300 is shifted from the current mode to the voltage mode (step S13). At this time, there are temporarily two power supply apparatus operating in the voltage mode. FIG. 6C illustrates an example in which the control mode is the voltage mode for the power supply apparatus 100 and 300. Thereafter, the control mode of the power supply apparatus 100 is shifted from the voltage mode to the stop mode (step S14). FIG. 6D illustrates that the control mode of the power supply apparatus 100 has shifted to the stop mode.

Here, at the time of step S13, there are two DC to DC converters operating in the voltage mode, and the DC to DC converters 140 and 340 operate in parallel. Because of the voltage drop by wiring resistance or the influence of the setting value error of the device, one or both of the DC to DC converters operating in the voltage mode may not control the voltage of the DC bus line 600 to a target voltage and tries to flow a current up to the limited current value, so that the system may become temporarily unstable.

Figure 7:
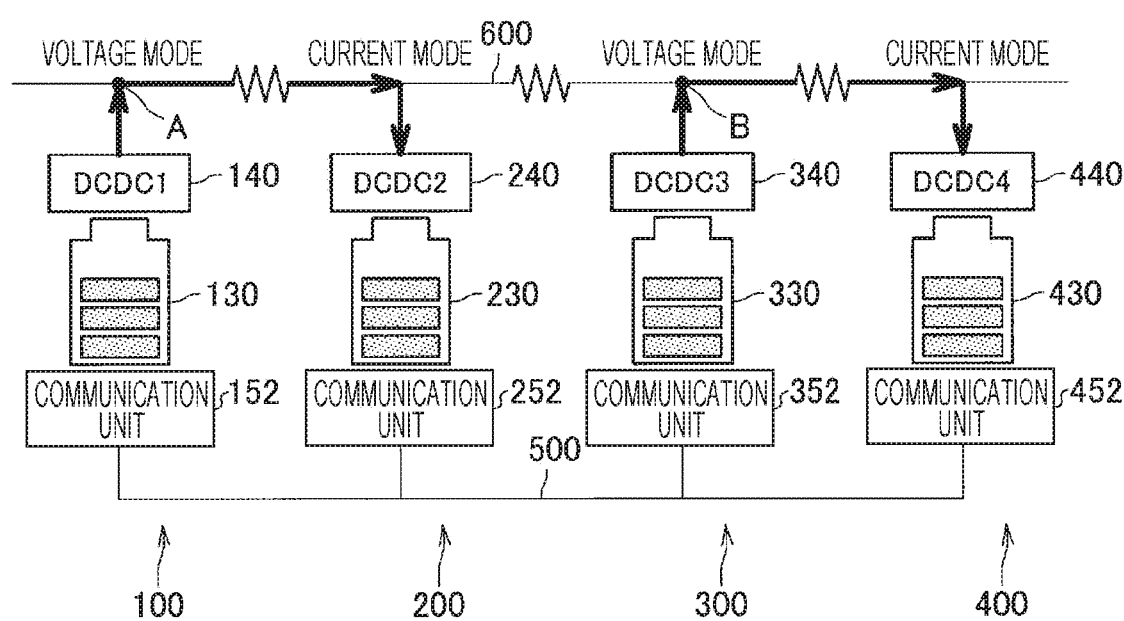
FIG. 7 is an explanatory diagram illustrating an example of a state in which there are two DC to DC converters operating in a voltage mode.

FIG. 7 is an explanatory diagram illustrating an example of a state in which there are two DC to DC converters operating in the voltage mode. In this case, the current flowing through the DC bus line 600 and the wiring resistance of the DC bus line 600 cause a potential difference between the points A and B of the DC bus line 600. In this state, in order to operate both DC to DC converter 140 and DC to DC converter 340 in the voltage mode, it is necessary to perform voltage setting in consideration of the potential difference between points A and B of the DC bus line 600. Therefore, in order to perform such voltage setting, the current of the DC bus line 600, the resistance value of the DC bus line 600, the voltage setting error of the DC to DC converter, and so on which cause the potential difference are desirably all monitored.

Second Embodiment

In the present embodiment, the droop rate having a predetermined value equal to or greater than 0 is set for the DC to DC converter only when the voltage control right of the DC bus line 600 is shifted from one DC to DC converter to another DC to DC converter. By setting the droop rate having a predetermined value to the DC to DC converter only when the voltage control right of the DC bus line 600 is shifted from one DC to DC converter to another DC to DC converter, it is possible to stably shift the voltage control right of the DC bus line 600 between the power supply apparatuses in the active P2P power interchange using the DC bus line 600.

Figure 8:
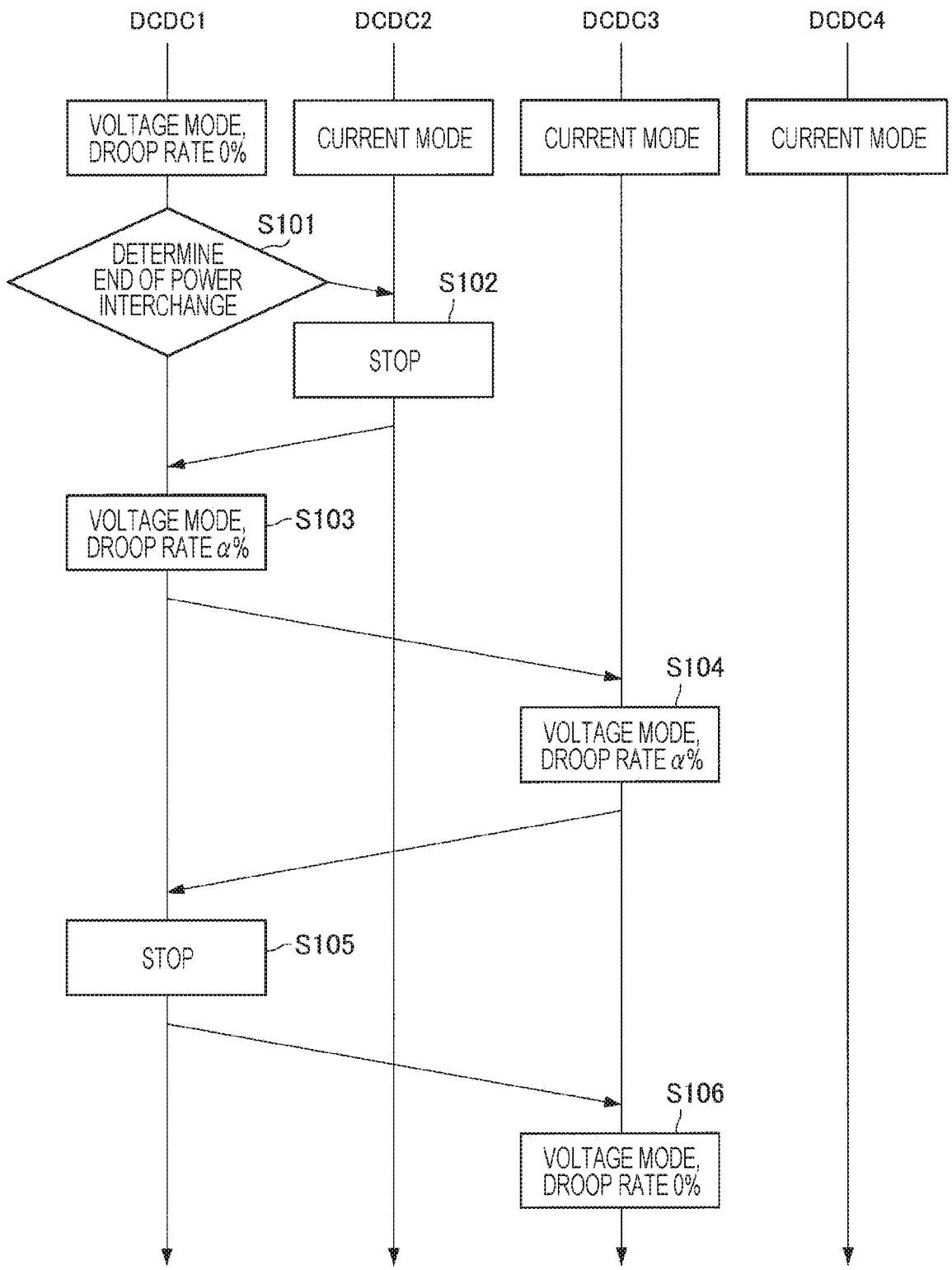
FIG. 8 is a flowchart illustrating an operation example of the DC to DC converter of each power supply apparatus according to the embodiment.
Figure 9A:
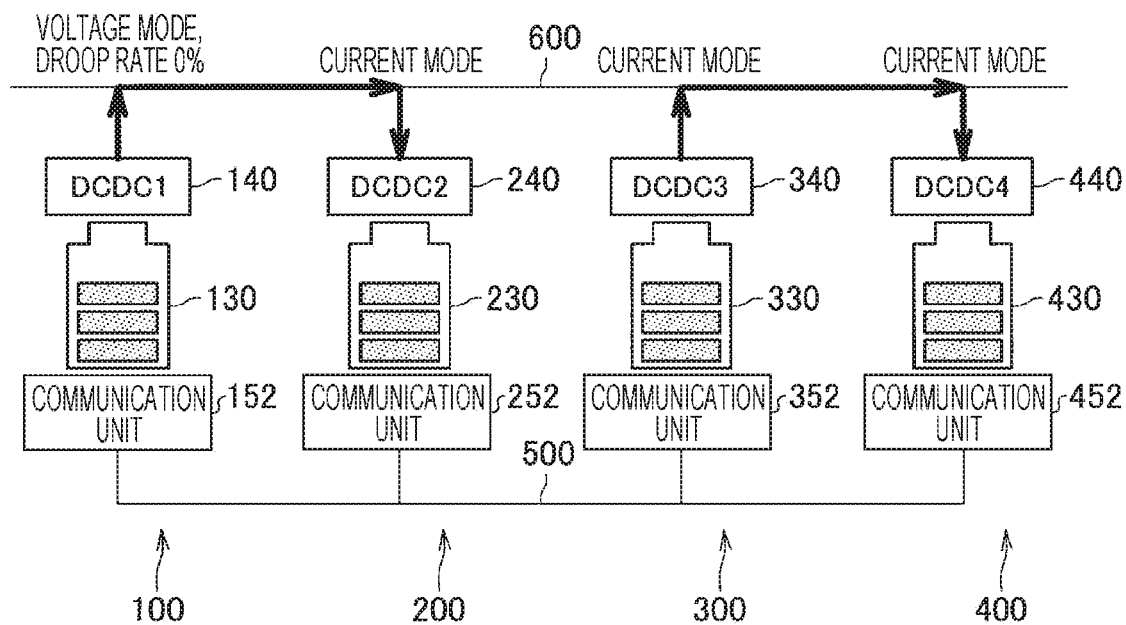
FIG. 9A is an explanatory diagram illustrating a state of the DC to DC converter.

FIG. 8 is a flowchart illustrating an operation example of the DC to DC converters of the individual power supply apparatuses according to the present embodiment. Furthermore, FIGS. 9A, 9B, 9C, 9D, 9E, and 9F are explanatory diagrams illustrating the state of individual power supply apparatuses corresponding to the operation in the operation example illustrated in FIG. 8. In the example of FIG. 8, the control mode of the power supply apparatus 100 is initially the voltage mode, the power supply apparatus 100 operates without performing the droop control (droop rate 0%), and the power supply apparatuses 200, 300, and 400 operate in the current mode as the control mode. FIG. 9A illustrates that the control mode of the power supply apparatus 100 is the voltage mode, the power supply apparatus 100 operates without performing the droop control (droop rate 0%), and the control mode of the power supply apparatuses 200, 300, 400 is the current mode. Furthermore, in this example, the power interchange is performed from the DC to DC converter 140 to the DC to DC converter 240 according to a predetermined agreement between the power supply apparatuses 100 and 200, and the power interchange is performed from the DC to DC converter 340 to the DC to DC converter 440 according to an agreement between the power supply apparatuses 300 and 400.

Figure 9B:
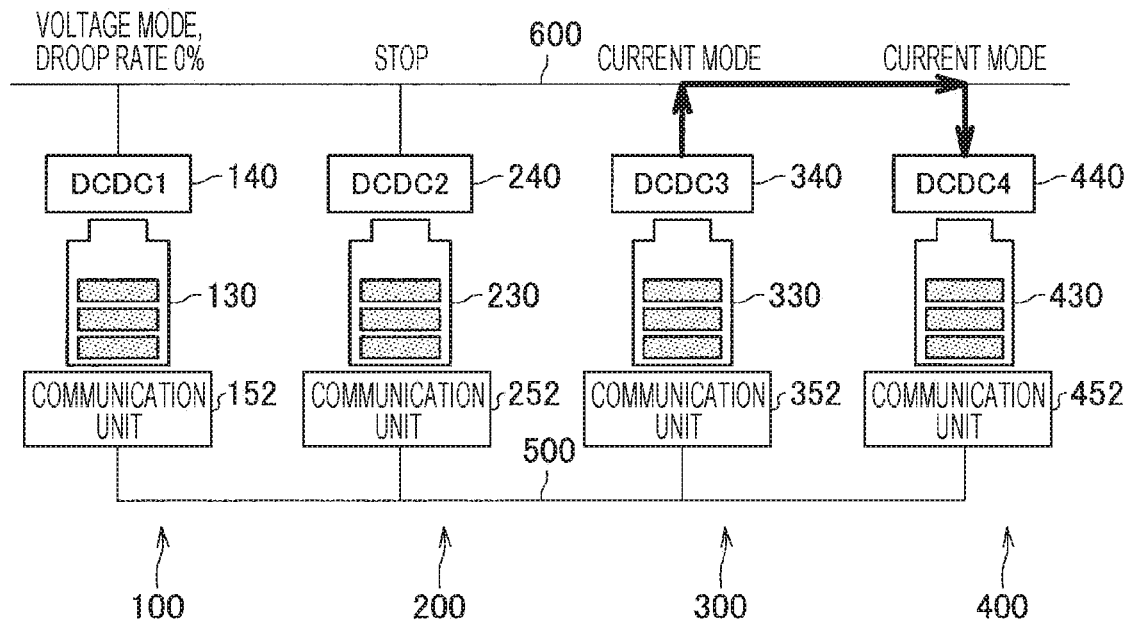
FIG. 9B is an explanatory diagram illustrating a state of the DC to DC converter.

For example, when the power interchange is performed from the DC to DC converter 140 to the DC to DC converter 240, the power control unit 153 determines whether a predetermined power interchange end condition is satisfied (step S101). If the predetermined power interchange end condition is satisfied, the power supply apparatus 100 transmits a request to stop the power interchange to the power supply apparatus 200. The power supply apparatus 200 shifts the control mode to the stop mode upon receipt of the request for stopping the power interchange (step S102). FIG. 9B illustrates that the control mode of the power supply apparatus 200 has shifted to the stop mode.

Figure 9C:
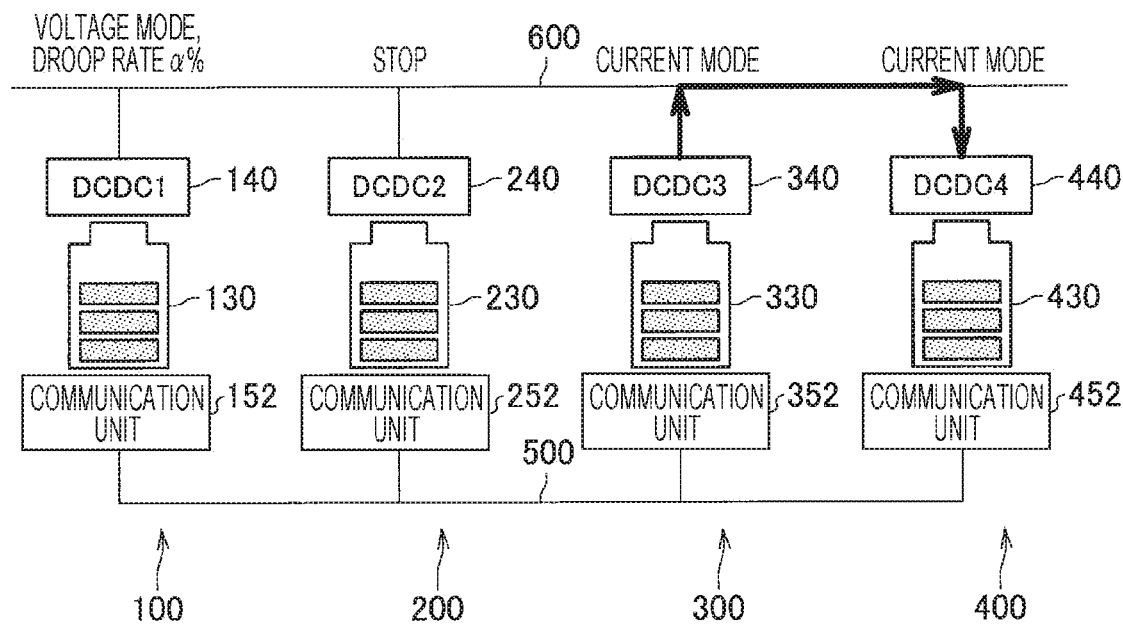
FIG. 9C is an explanatory diagram illustrating a state of the DC to DC converter.

Thereafter, the control right of the DC bus line 600 is transferred from the DC to DC converter 140 to the DC to DC converter 340 in response to the request for the control right from the power supply apparatus 300. Firstly, however, the control mode of the power supply apparatus 100 is shifted to the voltage mode in which the droop control is performed at a droop rate α% (step S103). FIG. 9C illustrates that the control mode of the power supply apparatus 100 has shifted to the voltage mode in which the droop control is performed at the droop rate α%.

Figure 9D:
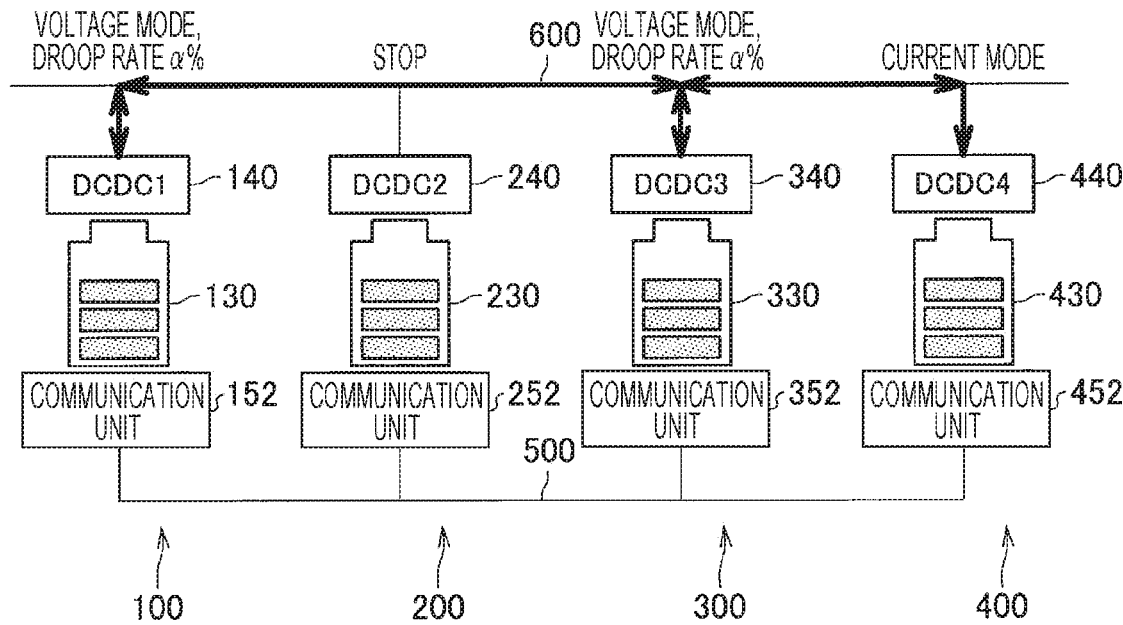
FIG. 9D is an explanatory diagram illustrating a state of the DC to DC converter.

When the control mode of the power supply apparatus 100 shifts to the voltage mode in which the droop control is performed at the droop rate α%, the controller 150 notifies the power supply apparatus 300 that the control mode of the power supply apparatus 100 has shifted to the voltage mode in which the droop control is performed at the droop rate α%. When the power supply apparatus 300 receives the notice that the control mode of the power supply apparatus 100 has shifted to the voltage mode for performing the droop control at the droop rate α%, the control mode of the power supply apparatus 300 is subsequently shifted to the voltage mode for performing the droop control similarly at the droop rate α% (step S104). FIG. 9D illustrates that the control mode of the power supply apparatus 300 has shifted to the voltage mode in which the droop control is performed at the droop rate α%.

Figure 9E:
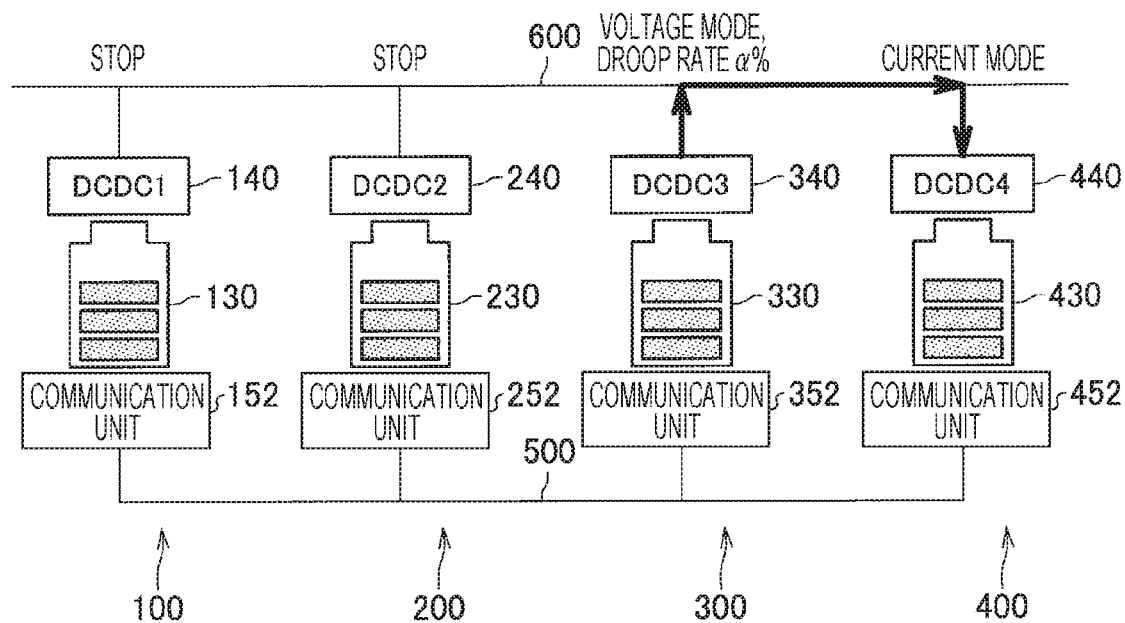
FIG. 9E is an explanatory diagram illustrating a state of the DC to DC converter.

When the control mode of the power supply apparatus 300 shifts to the voltage mode in which the droop control is performed at the droop rate α%, the controller 350 notifies the power supply apparatus 100 that the control mode of the power supply apparatus 300 has shifted to the voltage mode in which the droop control is performed at the droop rate α%. When the power supply apparatus 100 received the notice that the control mode of the power supply apparatus 300 has shifted to the voltage mode for performing the droop control at the droop rate α%, the control mode of the power supply apparatus 100 is subsequently shifted to the stop mode from the voltage mode in which the droop control is performed at the droop rate α% (step S105). FIG. 9E illustrates that the control mode of the power supply apparatus 100 has shifted to the stop mode. At this time, the power supply apparatus 100 sets the droop rate to 0%.

Figure 9F:
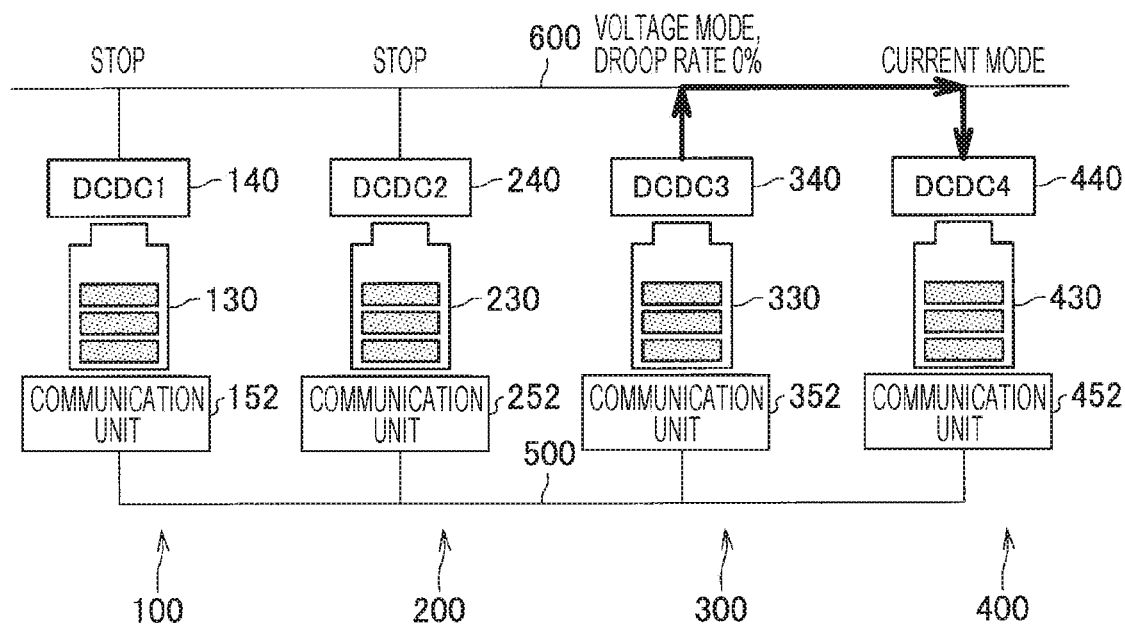
FIG. 9F is an explanatory diagram illustrating a state of the DC to DC converter.

When the control mode of the power supply apparatus 100 shifts to the stop mode, the control mode of the power supply apparatus 300 is subsequently shifted to the voltage mode in which the droop control is not performed (at the droop rate 0%) (step S106). FIG. 9F illustrates that the control mode of the power supply apparatus 300 has shifted to the voltage mode in which the droop control is not performed (droop rate 0%).

By such operation of the power supply apparatuses 100 and 300, it is possible to achieve the stable parallel operation of the two voltage mode of the DC to DC converters 140 and 340.

Figure 10:
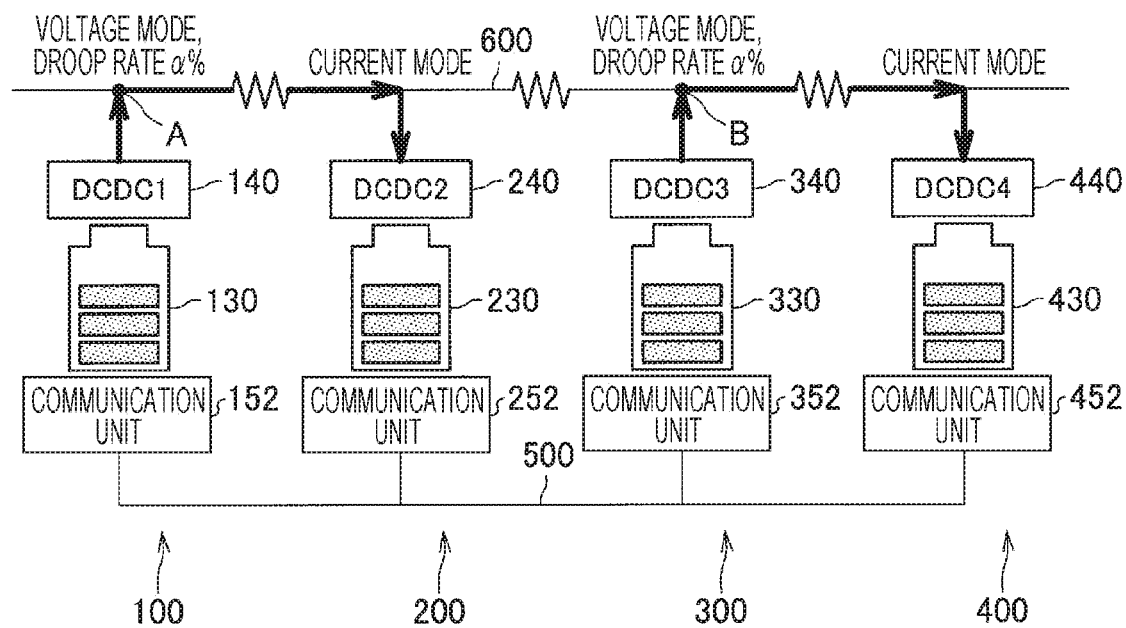
FIG. 10 is an explanatory diagram illustrating a parallel operation in a voltage mode using droop control.
Figure 11:
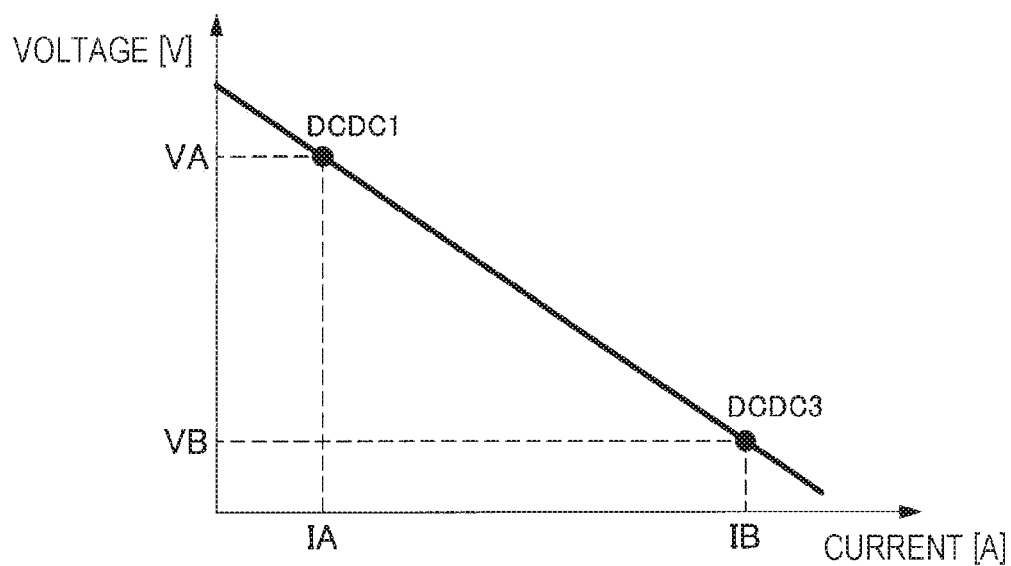
FIG. 11 is an explanatory diagram for explaining droop control.

FIG. 10 is an explanatory diagram illustrating parallel operation in voltage mode using the droop control. FIG. 11 is an explanatory diagram for explaining the droop control plotted as a graph in which the horizontal axis represents the current flowing through the DC bus line 600 and the vertical axis represents the voltage of the DC bus line 600. By setting the droop rate of the DC to DC converters 140 and 340, to which the control right of the DC bus line 600 is transferred, to a, the DC to DC converters 140 and 340 enter the droop control, so that the DC to DC converters 140 and 340 can passively balance the current at the current I_A by the DC to DC converter 140 and at the current I_B by the DC to DC converter 340, even when there is a voltage difference between the DC to DC converters 140 and 340. Therefore, the overcurrent does not flow from the DC to DC converters 140 and 340.

Figure 12:
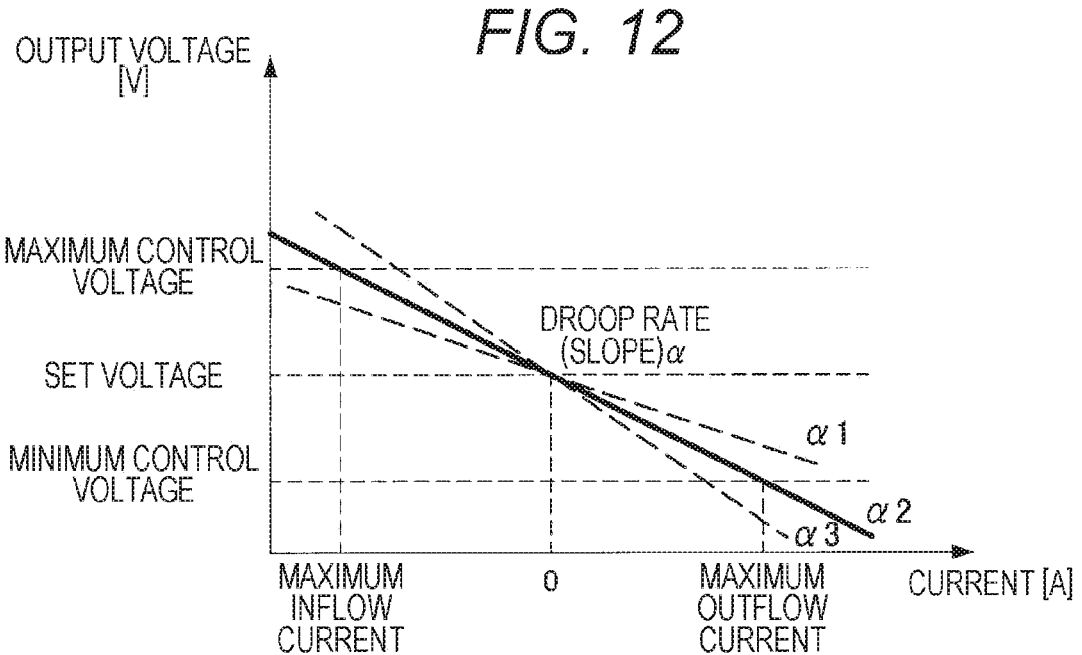
FIG. 12 is an explanatory diagram illustrating an example of setting a droop rate of the DC to DC converter.

FIG. 12 is an explanatory diagram illustrating an example of setting the droop rate of the DC to DC converters, plotting a graph in which the horizontal axis indicates the current flowing through the DC bus line 600 and the vertical axis indicates the voltage of the DC bus line 600. Each DC to DC converter can set the droop rate, that is, a slope of the output voltage with respect to the outflow or inflow current. Accordingly, the droop rate (slope) of the DC to DC converter can be set such that the maximum control voltage is obtained at the maximum inflow current, and the minimum control voltage is obtained at the maximum outflow current. By setting the droop rate (slope) in this manner, it is possible to implement parallel operations of the DC to DC converters within the control range in the voltage mode.

Figure 13:
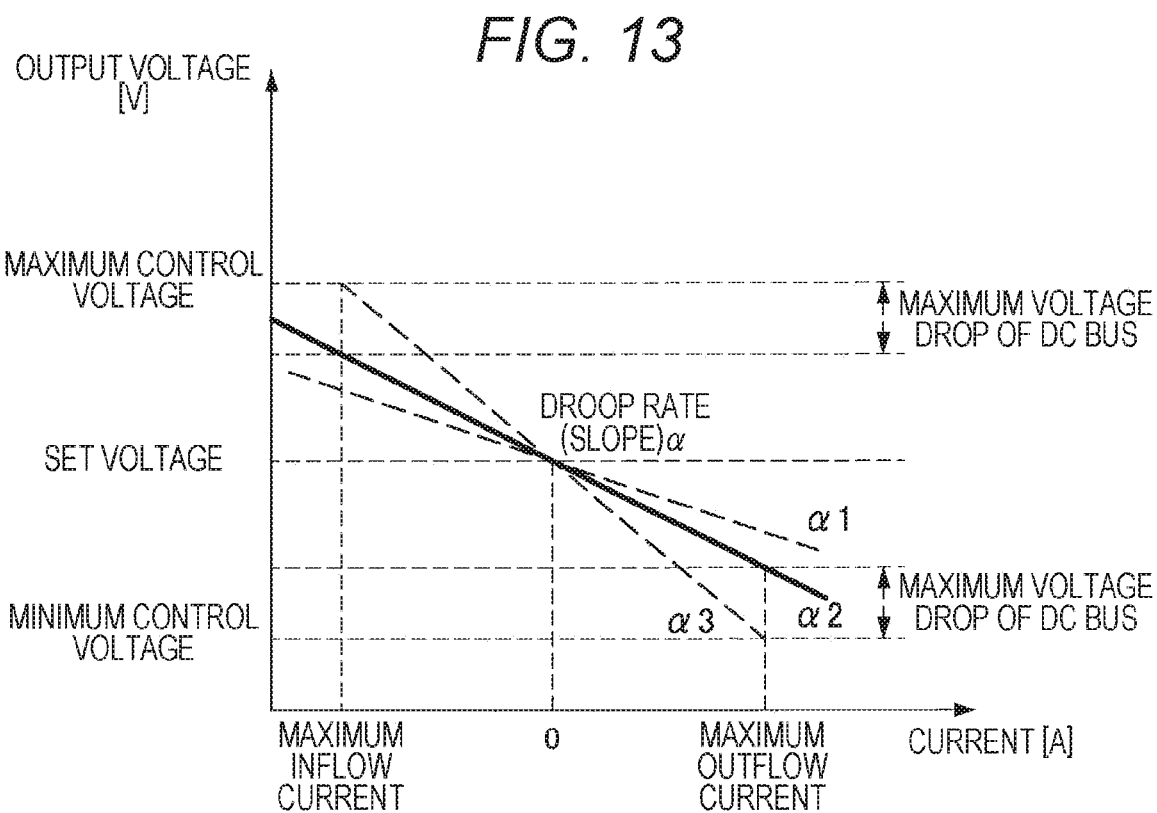
FIG. 13 is an explanatory diagram illustrating an example of setting a droop rate of the DC to DC converter.

FIG. 13 is an explanatory diagram illustrating another example of setting the droop rate of the DC to DC converters, plotting a graph in which the horizontal axis represents the current flowing through the DC bus line 600 and the vertical axis represents the voltage of the DC bus line 600. In this example, the droop rate (slope) of the DC to DC converter is set in consideration of a voltage drop when the current flows through the DC bus line 600 in addition to the above-described outflow and inflow current. By setting the droop rate (slope) of the DC to DC converter in consideration of the voltage drop, it is possible to implement the parallel operation of the DC to DC converters within the control range in the voltage mode in consideration of the voltage drop of the DC bus line 600.

Figure 14:
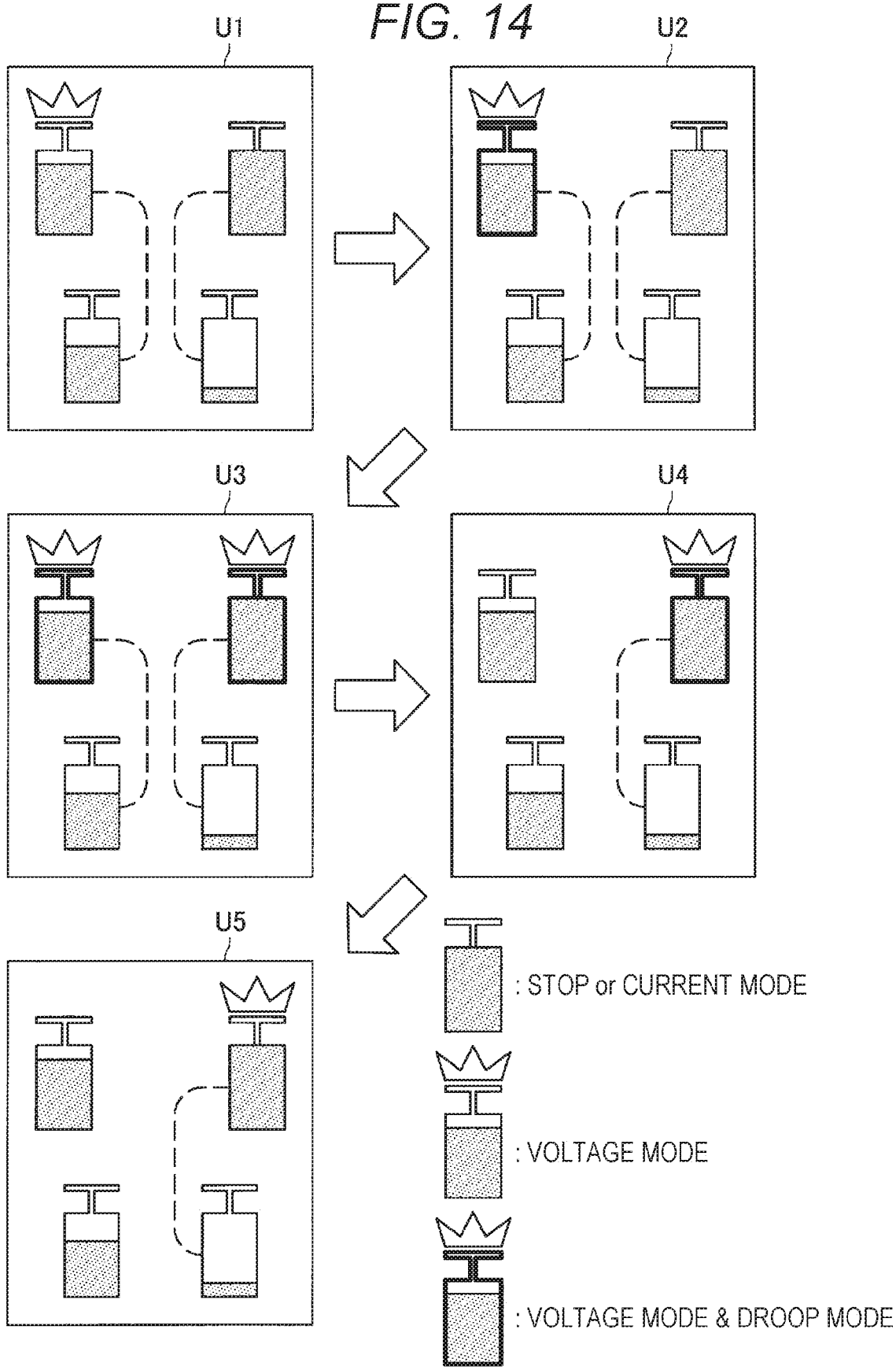
FIG. 14 is an explanatory diagram illustrating a display example for confirming in which operation mode the DC to DC converter is operating.

A display example for remotely confirming in which operation mode the power supply apparatuses operate. FIG. 14 is an explanatory diagram illustrating a display example for confirming in which operation mode the power supply apparatus operates.

A display U1 corresponds to the state illustrated in FIG. 9A in which the power interchange is performed from the power supply apparatus 100 to the power supply apparatus 200 and from the power supply apparatus 300 to the power supply apparatus 400.

A display U2 corresponds to the state illustrated in FIG. 9C in which the control mode of the power supply apparatus 100 is shifted from the voltage mode with no droop control to the voltage mode in which the droop control is performed at the droop rate α%. Furthermore, a display U3 corresponds to the state illustrated in FIG. 9D in which the control mode of power supply apparatus 300 has shifted from the current mode to the voltage mode in which the droop control is performed at the droop rate α%.

A display U4 corresponds to the state illustrated in FIG. 9E in which the control mode of the power supply apparatus 100 has shifted from the voltage mode in which the droop control is performed at the droop rate α% to the stop mode. Then, a display U5 corresponds to the state illustrated in FIG. 9F in which the power supply apparatus 300 has shifted from the voltage mode in which the droop control is performed at the droop rate α% to the voltage mode with no droop control.

These displays can be displayed on a display device such as a display of a device connected directly, for example, with the communication line 500 or indirectly through the Internet or the like.

Third Embodiment

In the second embodiment, the power supply apparatus operating in the voltage mode shifts to the stop mode after transferring the control right of the DC bus line 600 to another power supply apparatus. Alternatively, the power supply apparatus operating in the voltage mode may not shift to the stop mode after transferring the control right of the DC bus line 600 to another power supply apparatus, and may shift to the current mode.

Figure 15:
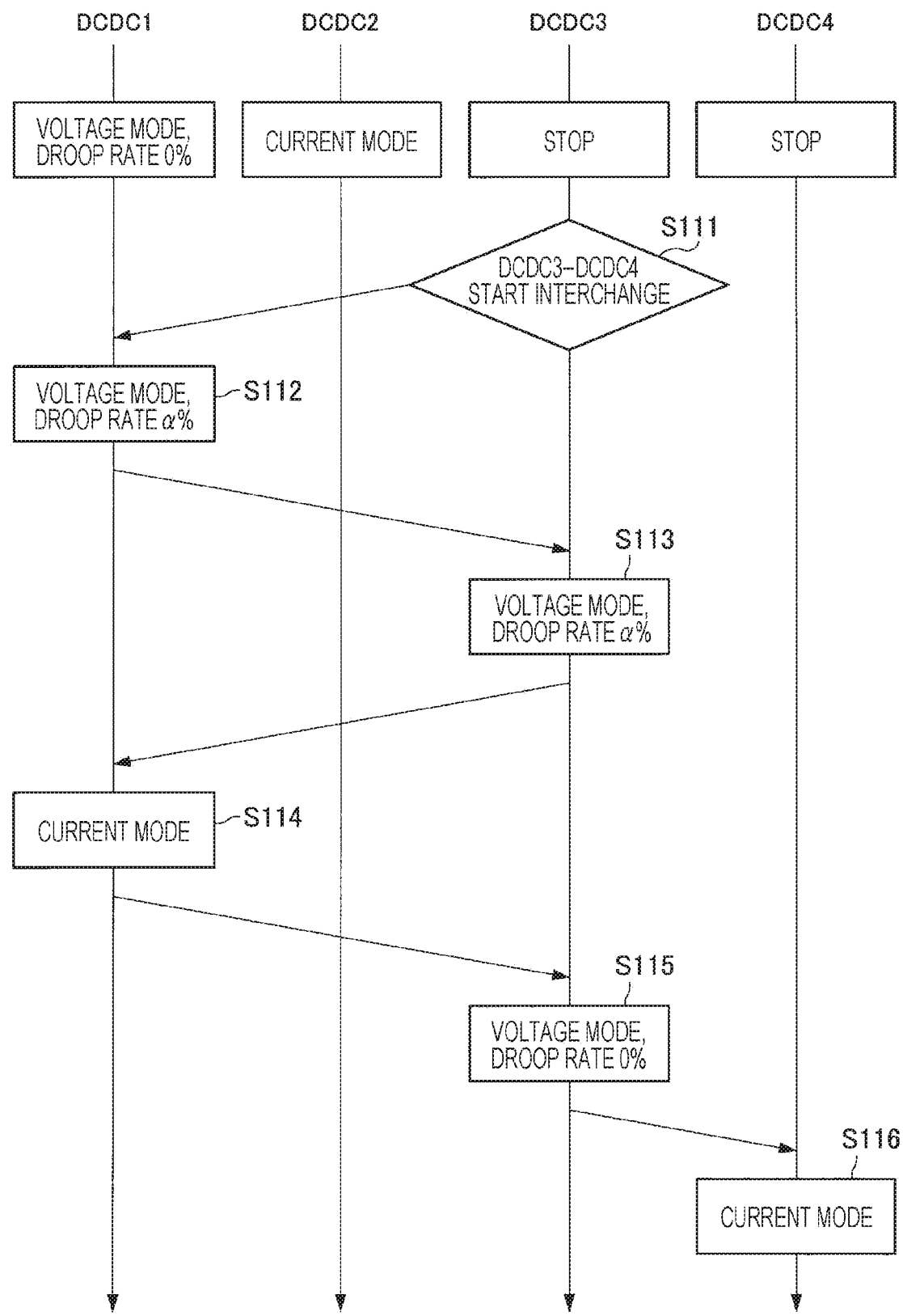
FIG. 15 is a flowchart illustrating an operation example of the DC to DC converter of each power supply apparatus according to the embodiment.
Figure 16A:
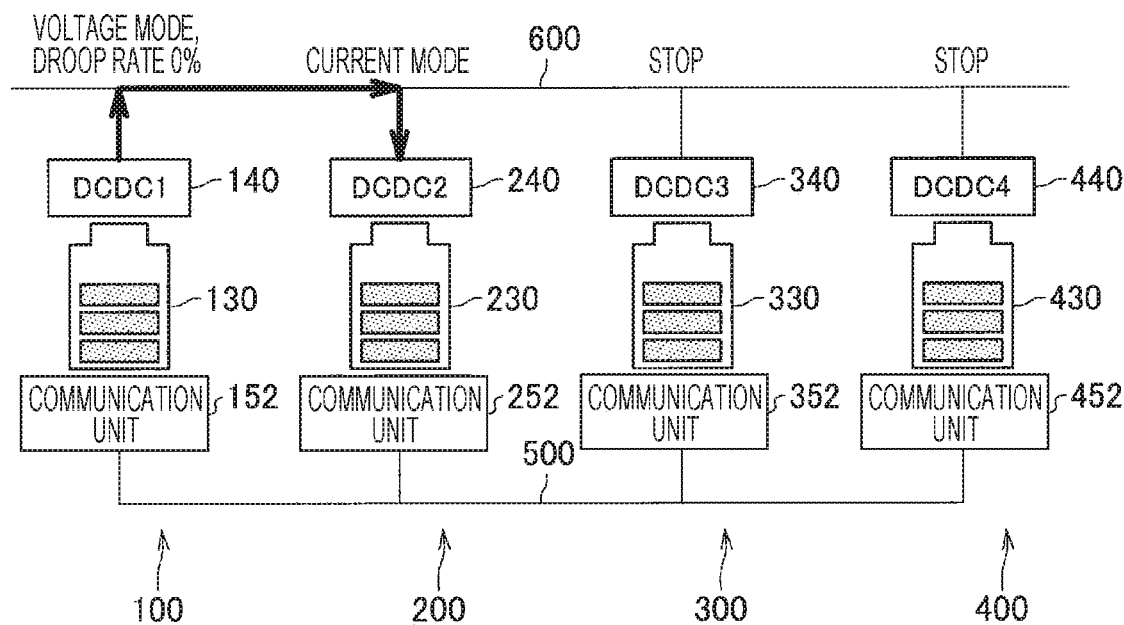
FIG. 16A is an explanatory diagram illustrating a state of the DC to DC converter.

FIG. 15 is a flowchart illustrating an operation example of the DC to DC converters of the power supply apparatuses according to the present embodiment. FIGS. 16A, 16B, 16C, 16D, 16E, and 16F are explanatory diagrams illustrating the state of the DC to DC converters corresponding to the respective operations in the operation example illustrated in FIGS. 16A, 16B, 16C, 16D, 16E, and 16F. In the example of FIGS. 16A, 16B, 16C, 16D, 16E, and 16F, the control mode of the power supply apparatus 100 is initially the voltage mode, and the power supply apparatus 100 operates without droop control (at the droop rate 0%), while the power supply apparatus 200 operates in the current mode. The control mode of the power supply apparatus 400 is the stop mode. In FIG. 16A, the control mode of the power supply apparatus 100 is the voltage mode, and the power supply apparatus 100 operates without the droop control (droop rate 0%), while the control mode of the power supply apparatus 200 is the current mode, and the control mode of the power supply apparatuses 300 and 400 is the stop mode. Further, in this example, it is assumed that power is supplied from the DC to DC converter 140 to the DC to DC converter 240 in advance according to the agreement between the power supply apparatuses 100 and 200.

Figure 16B:
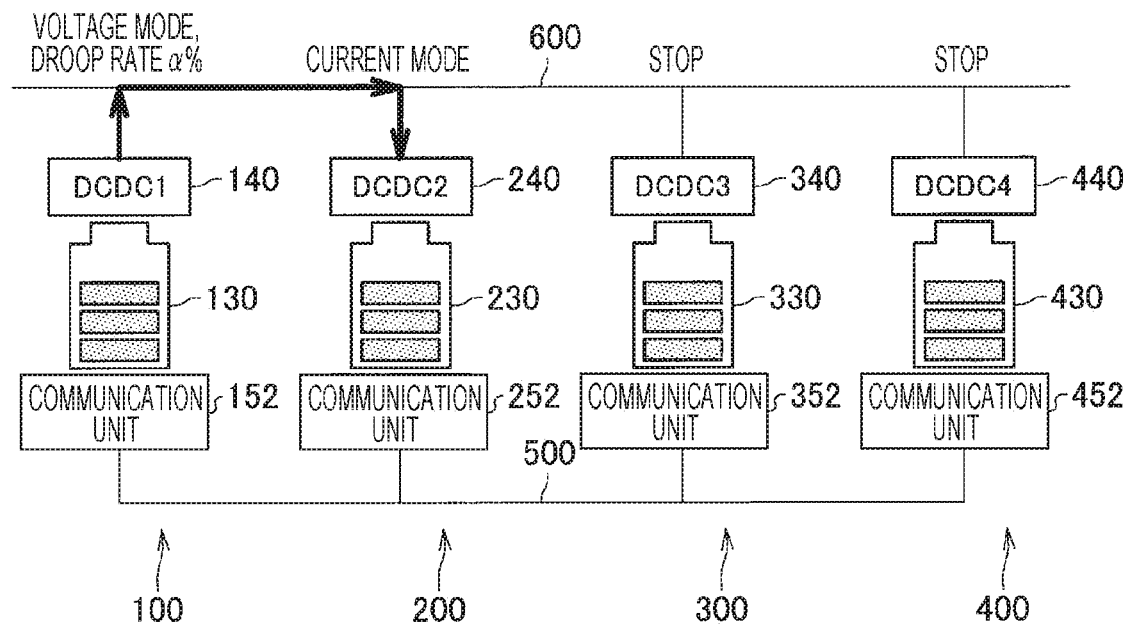
FIG. 16B is an explanatory diagram illustrating a state of the DC to DC converter.

In this state, it is assumed that the power interchange from the DC to DC converter 340 to the DC to DC converter 440 is started by exchanging a predetermined message between the power supply apparatuses 300 and 400 (step S111). The start of the power interchange from the DC to DC converter 340 to the DC to DC converter 440 is transmitted to the power supply apparatus 100 that has the control right of the DC bus line 600. Here, when the power supply apparatus 100 intends to transfer the control right of the DC bus line 600 to the DC to DC converter 340, the control mode is shifted to the voltage mode in which the droop control is performed at the droop rate α% (step S112). FIG. 16B illustrates that the control mode of the power supply apparatus 100 has shifted to the voltage mode in which the droop control is performed at the droop rate 60%.

Figure 16C:
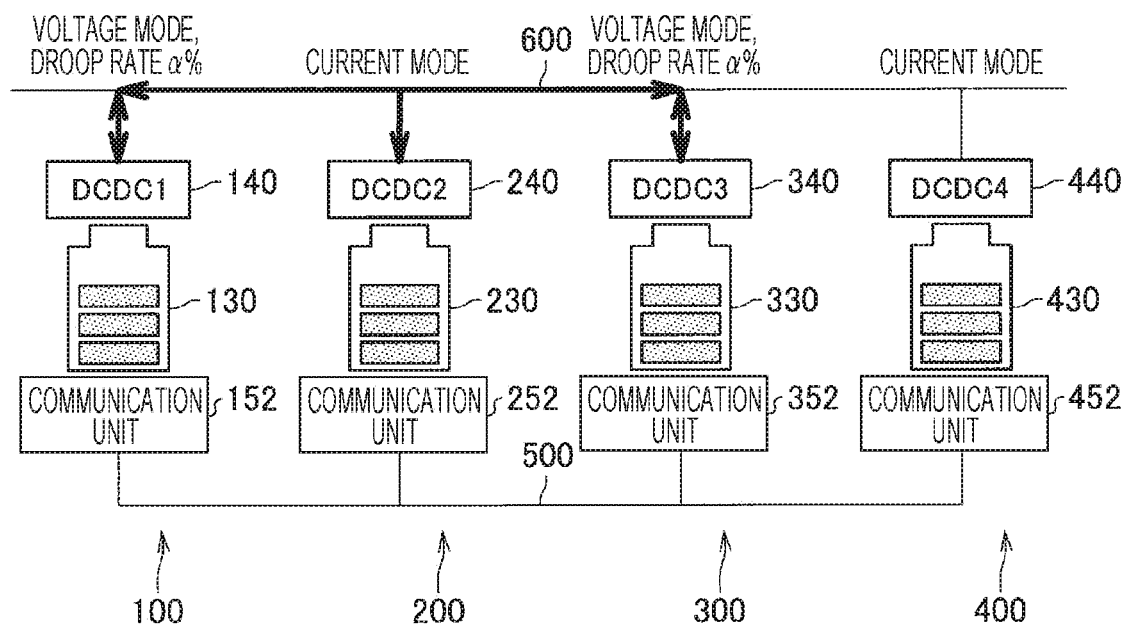
FIG. 16C is an explanatory diagram illustrating a state of the DC to DC converter.

When the control mode of the power supply apparatus 100 shifts to the voltage mode in which the droop control is performed at the droop rate α%, the controller 150 notifies the power supply apparatus 300 that the control mode of the power supply apparatus 100 has shifted to the voltage mode in which the droop control is performed at the droop rate α%. When the power supply apparatus 300 receives the notice that the control mode of the power supply apparatus 100 has shifted to the voltage mode in which the droop control is performed at the droop rate α%, the power supply apparatus 300 subsequently also shifts its control mode to the voltage mode for performing the droop control at the droop rate α% (step S113). FIG. 16C illustrates that the control mode of the power supply apparatus 300 has shifted to the voltage mode in which the droop control is performed at the droop rate α%.

Figure 16D:
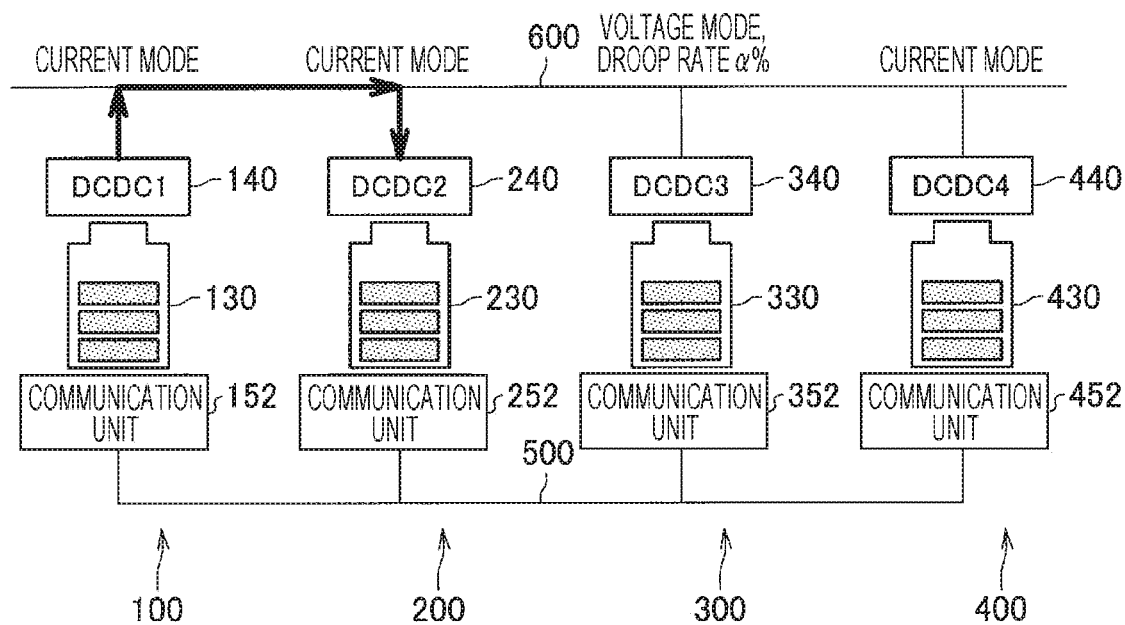
FIG. 16D is an explanatory diagram illustrating a state of the DC to DC converter.

When the control mode of the power supply apparatus 300 shifts to the voltage mode in which the droop control is performed at the droop rate α%, the controller 350 notifies the power supply apparatus 100 that the control mode of the power supply apparatus 300 has shifted to the voltage mode in which the droop control is performed at the droop rate α%. When the power supply apparatus 100 receives the notice that the control mode of the power supply apparatus 300 has shifted to the voltage mode for performing the droop control at the droop rate α%, the power supply apparatus 100 subsequently also shifts its control mode from the voltage mode in which the droop control is performed at the droop rate α% to the current mode (step S114). FIG. 16D illustrates that the control mode of the power supply apparatus 100 has shifted to the current mode.

Figure 16E:
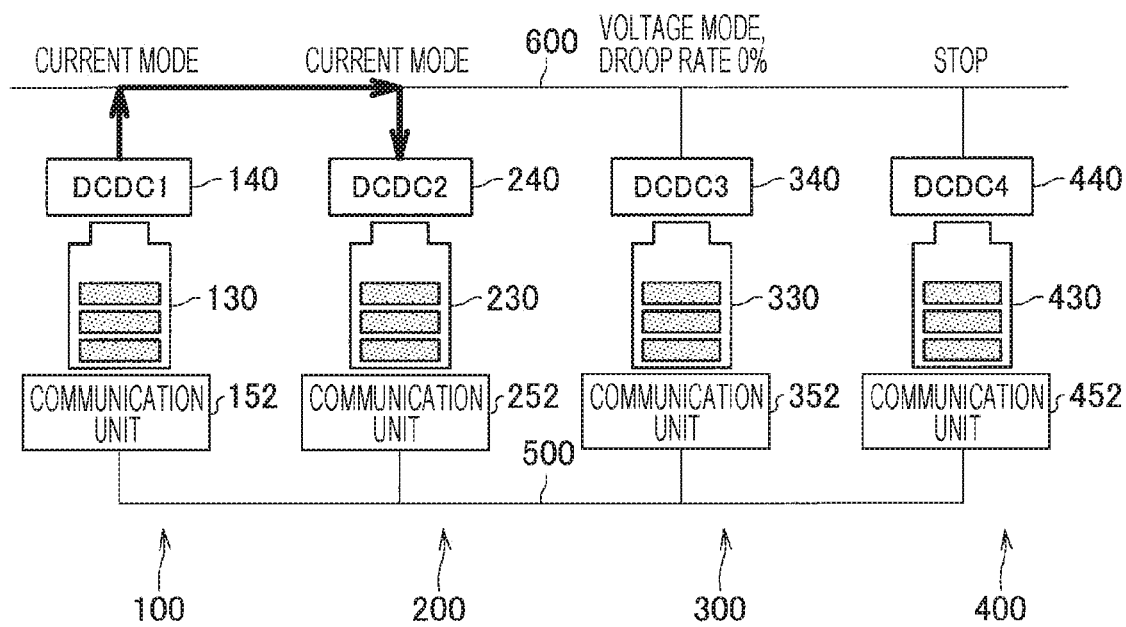
FIG. 16E is an explanatory diagram illustrating a state of the DC to DC converter.

When the control mode of the power supply apparatus 100 has shifted to the current mode, the controller 150 notifies the power supply apparatus 300 that the control mode of the power supply apparatus 100 has shifted to the current mode. When the power supply apparatus 300 receives the notice that the control mode of the power supply apparatus 100 has shifted to the current mode, the power supply apparatus 300 subsequently also shifts the control mode to the voltage mode in which no droop control is performed (at the droop rate 0%) (Step S115). FIG. 16E illustrates that the control mode of the power supply apparatus 300 has shifted to the voltage mode in which no droop control is performed (at the droop rate 0%).

Figure 16F:
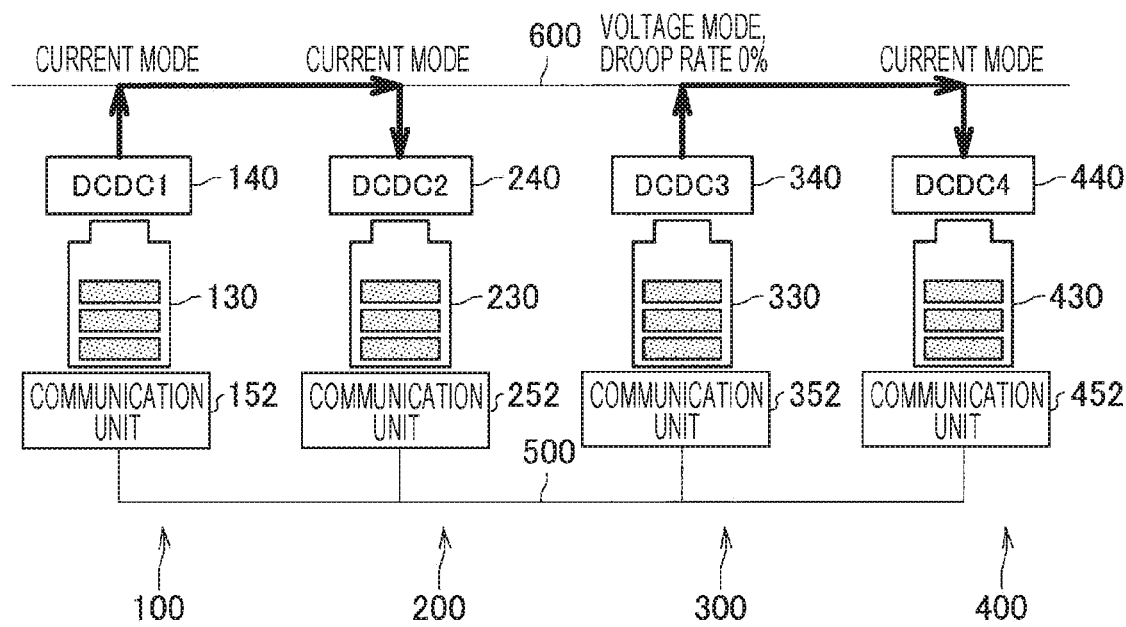
FIG. 16F is an explanatory diagram illustrating a state of the DC to DC converter.

When the control mode of the power supply apparatus 300 has shifted to the voltage mode in which no droop control is performed (droop rate 0%), the controller 350 notifies the power supply apparatus 400 that the preparation for power interchange is ready. When the power supply apparatus 400 receives the notice from the controller 350 that the preparation for power interchange is ready, the power supply apparatus 400 shifts its control mode to the current mode (step S116). FIG. 16F illustrates that the control mode of the power supply apparatus 400 has shifted to the current mode.

Such a case is effective, for example, when there is a DC to DC converter having a large power capacity in the power supply system 1. By setting such a DC to DC converter having the large power capacity to the voltage mode, the ability to absorb the current imbalance of the DC grid is enhanced, and the stability at the time of failure or the like can be improved. Even in such a case, the voltage control right of the DC bus line 600 can be stably transferred by performing the transition of the control mode using the droop control, as illustrated in FIG. 15.

Figure 17:
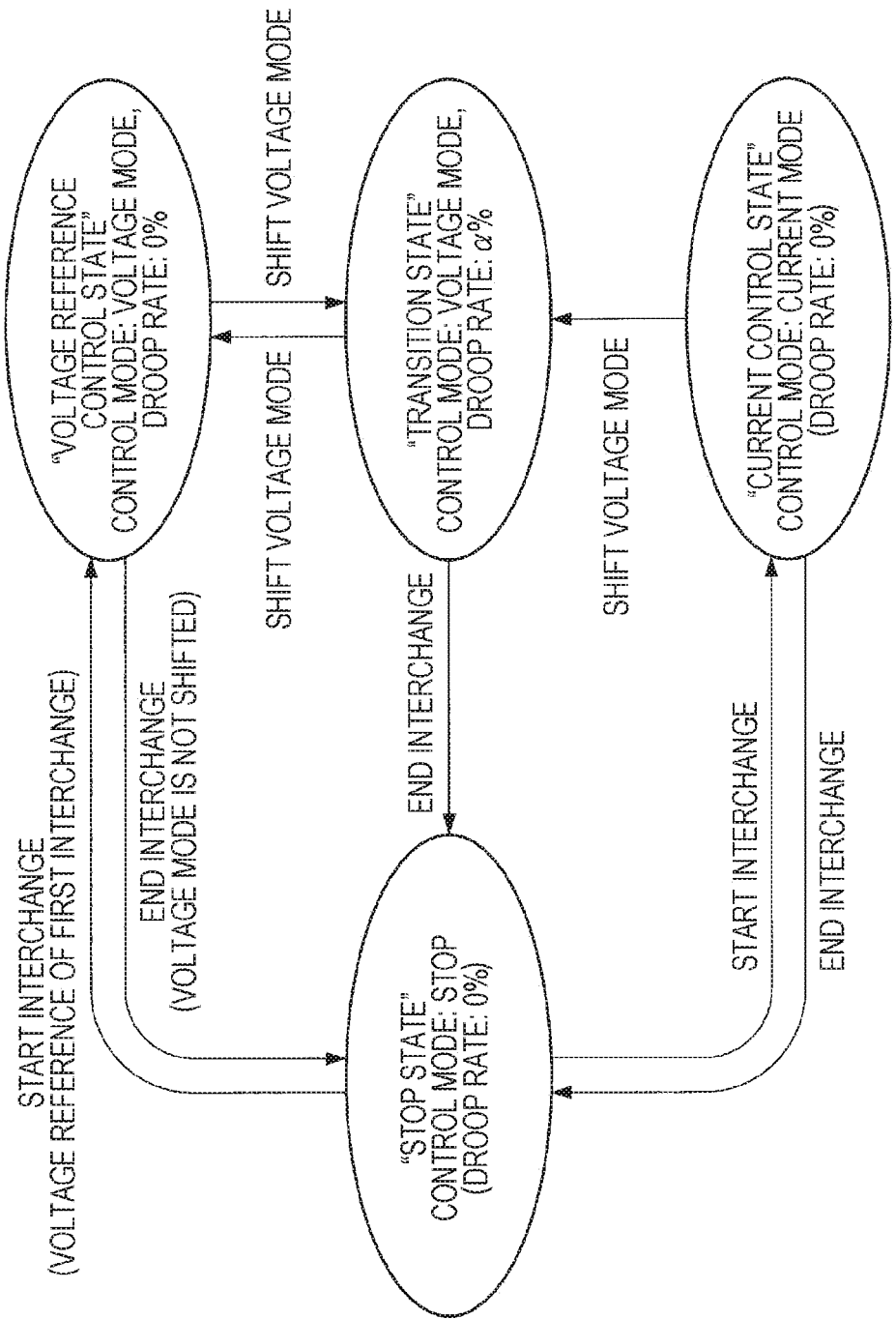
FIG. 17 is an explanatory diagram illustrating a state transition diagram of the DC to DC converter.

In order to wrap up the description so far, the state of the control mode of the power supply apparatus will be described using a state transition diagram. FIG. 17 is an explanatory diagram illustrating the state transition diagram of the control mode of the power supply apparatus. FIG. 17 is the state transition diagram illustrating the case where the power supply apparatus shifts its control mode to the stop mode after shifting the voltage control right of the DC bus line 600 to another power supply apparatus, as illustrated in FIGS. 9A, 9B, 9C, 9D, 9E, and 9F.

In the state where no power interchange is performed, the control mode of the power supply apparatus is the stop mode, and the droop rate is 0% (this state is referred to as "stop state"). To perform power interchange to other power supply apparatuses, if there is a power supply apparatus having the control right of the DC bus line 600, the control mode is shifted to the current mode (droop rate 0%) (this state is referred to as a "current control mode"). If there is no other power supply apparatus having the control right of the DC bus line 600, the control mode is shifted to the voltage mode (droop rate 0%) in which the droop control is not performed (this state is referred to as a "voltage reference control state").

When the power supply apparatus in the voltage reference control state completes the power interchange and transfers the control right of the DC bus line 600 to another power supply apparatus, the power supply apparatus is shifted to the voltage mode in which the droop control is performed at the droop rate α% (this state is referred to as a "transition state") once, before shifting to the stop state.

Not that, when the power interchange is completed and it is not necessary to transfer the control right of the DC bus line 600 to other power supply apparatuses, the power supply apparatus may be directly shifted to the stop state without going through the transition state.

When the power supply apparatus in the current control state receives the control right of the DC bus line 600 from another power supply apparatus, the power supply apparatus moves to the transition state once before moving to the voltage reference control state.

Figure 18:
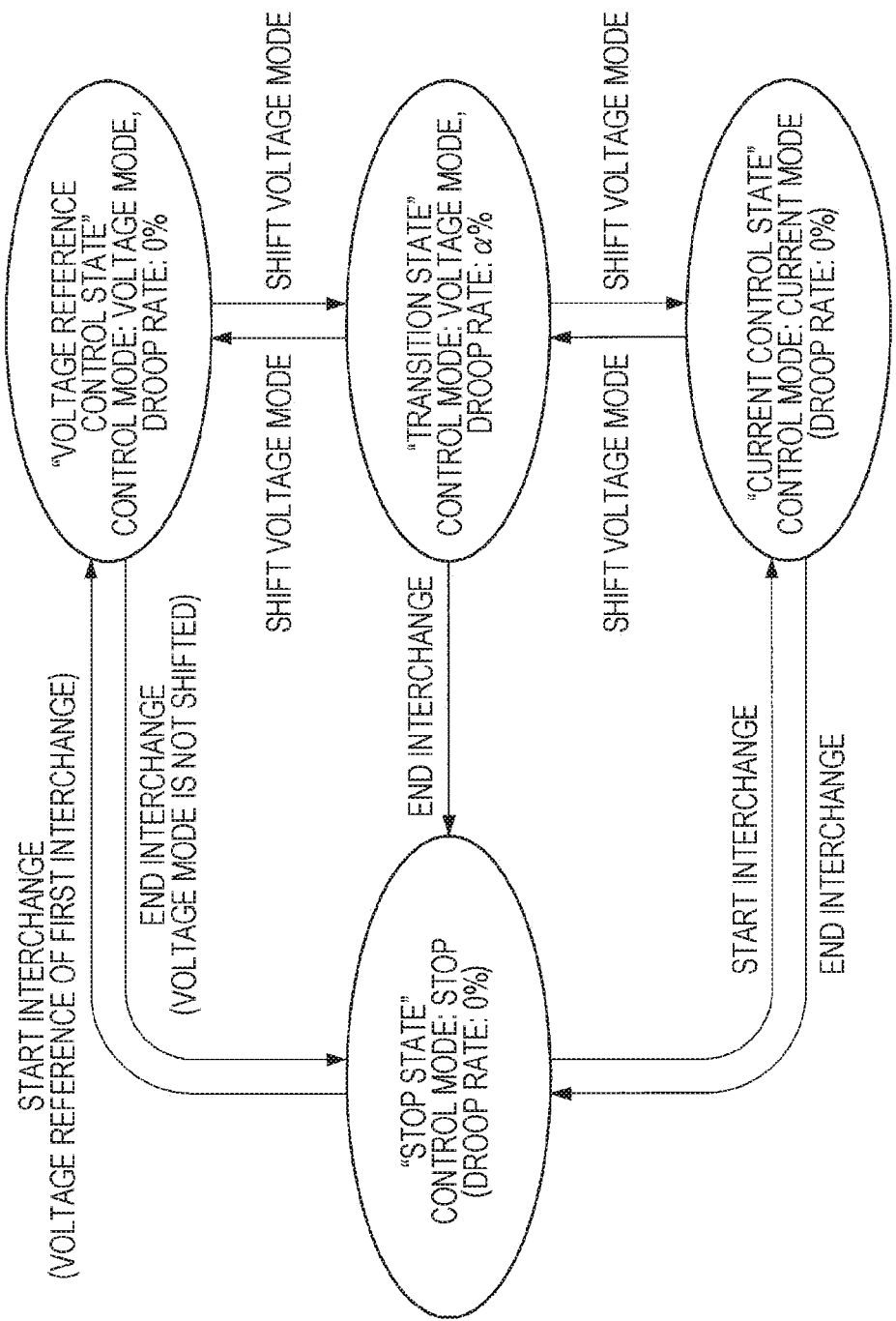
FIG. 18 is an explanatory diagram illustrating a state transition diagram of the DC to DC converter.

FIG. 18 is an explanatory diagram illustrating a state transition diagram of the power supply apparatus in another embodiment. FIG. 18 is the state transition diagram illustrating the case where the power supply apparatus shifts its control mode to the stop mode or the current mode after transferring the control right of the DC bus line 600 to another power supply apparatus, as illustrated in FIG. 15.

To transfer the control right of the DC bus line 600 to another power supply apparatus, the power supply apparatus in the voltage reference control state is shifted to the transition state once before being shifted to the current control state even during the performance of the power interchange. When the power interchange is completed and the control right of the DC bus line 600 is transferred to another power supply apparatus, the power supply apparatus is shifted to the transition state from the voltage reference control state once before being shifted to the stop state. Even in this case, when the power interchange is completed and there is no need to transfer the control right of the DC bus line 600 to another power supply apparatus, the power supply apparatus can directly be shifted to the stop state from the voltage reference control state without going through the transition state.

Figure 19:
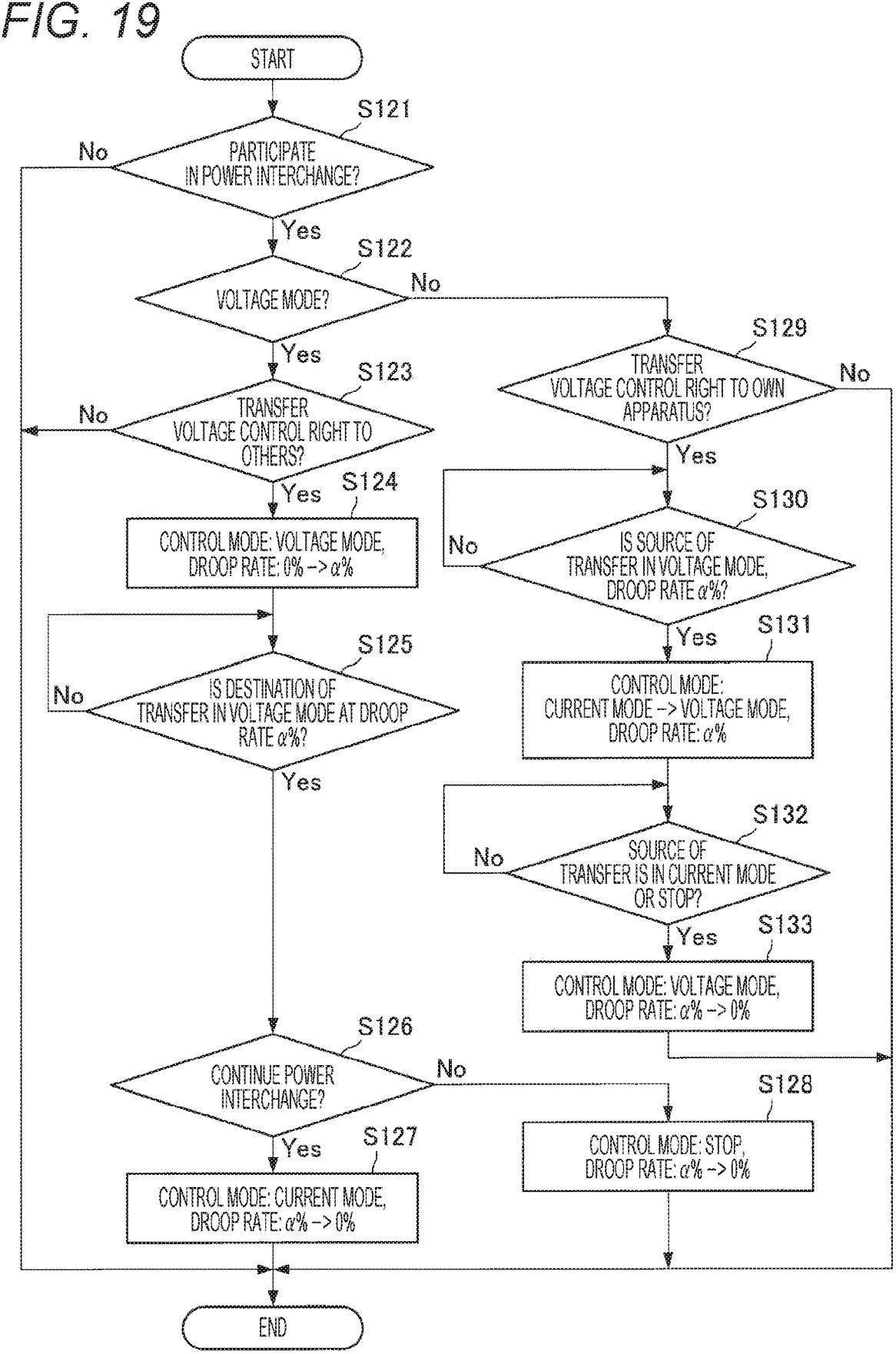
FIG. 19 is a flowchart illustrating an operation example of the power supply apparatus according to the embodiment.

Subsequently, an operation example of each power supply apparatus will be described. FIG. 19 is a flowchart illustrating an operation example of the power supply apparatus (e.g., the power supply apparatus 100) according to the embodiment of the present disclosure. FIG. 19 illustrates a control example in the control mode of the power supply apparatus when the control right of the DC bus line 600 is shifted between the power supply apparatuses. A series of operation steps described below is assumed to be executed by the controller 150 or the power control unit 153, unless otherwise specified.

When controlling in the control mode, the power supply apparatus first determines whether or not the power supply apparatus is participating in the power interchange through the DC bus line 600 (step S121). If not participating in the power interchange through the DC bus line 600 (No at step S121), the power supply apparatus simply ends the process. On the other hand, when participating in the power interchange through the DC bus line 600 (Yes at step S121), the power supply apparatus determines whether the power supply apparatus is in the voltage mode (step S122).

If the DC to DC converter is in the voltage mode (Yes at step S122), the power supply apparatus determines whether the voltage control right of the DC bus line 600 should be transferred to another power supply apparatus (step S123). When the voltage control right of the DC bus line 600 is not transferred to another power supply apparatus (No at step S123), the power supply apparatus simply ends the process. On the other hand, when transferring the voltage control right of the DC bus line 600 to another power supply apparatus (Yes at step S123), the power supply apparatus shifts its control mode of the power supply apparatus to the voltage mode for performing droop control at a droop rate α% (step S124), and stands by until the control mode of the power supply apparatus to which the voltage control right of the DC bus line 600 is transferred is the voltage mode capable of performing the droop control at the droop rate α% (step S125).

When the control mode of the power supply apparatus to which the voltage control right of the DC bus line 600 is transferred is the voltage mode for performing the droop control at the droop rate α% (Yes at step S125), the power supply apparatus determines whether the power interchange through the DC bus line 600 should be continued (step S126). If the power interchange through the DC bus line 600 is to be continued (Yes at step S126), the power supply apparatus shifts the control mode to the current mode (step S127). If the power interchange through the DC bus line 600 is to be continued (No at step S126), the power supply apparatus shifts the control mode to the stop mode (step S128).

If it is determined in step S122 that the control mode of the power supply apparatus is not the voltage mode (No at step S122), the power supply apparatus determines whether to transfer voltage control right of DC bus line 600 from another power supply apparatus (step S129). When the voltage control right of the DC bus line 600 is not transferred from another power supply apparatus (No at step S129), the power supply apparatus simply ends the process. On the other hand, when transferring the voltage control right of the DC bus line 600 from another power supply apparatus (Yes at step S129), the power supply apparatus stands by until the control mode of the power supply apparatus from which the voltage control right of the DC bus line 600 is transferred is shifted to the voltage mode in which the droop control is performed at the droop rate α% (step S130).

Then, when the control mode of the power supply apparatus from which the voltage control right of the DC bus line 600 is transferred is shifted to the voltage mode for performing the droop control at the droop rate α% (Yes at step S130), the power supply apparatus shifts the control mode to the voltage mode in which the droop control is performed at the droop rate α% (step S131). Subsequently, the power supply apparatus stands by until the control mode of the power supply apparatus from which the voltage control right of the DC bus line 600 is shifted to the current mode or the stop mode (step S132). Subsequently, when the control mode of the power supply apparatus from which the voltage control right of the DC bus line 600 is shifted to the current mode or the stop mode (Yes at step S132), the power supply apparatus shifts the control mode to the voltage mode in which no droop control is performed (step S133).

The power supply apparatus according to the embodiment of the present disclosure enables the stable transfer of the voltage control right of the DC bus line 600 between the power supply apparatuses connected to the DC bus line 600 by executing the above-described series of operations.

Note that, in the above description, the same droop rate is set in transferring the voltage control right at the source and the destination of the voltage control right of the DC bus line 600, but the present disclosure is not limited to such an example. A different droop rate may be set at the source and the destination of the voltage control right in transferring the voltage control right.

<2. Summary>

As described above, according to the embodiment of the present disclosure, the droop rate having a predetermined value is set only when the voltage control right of the DC bus line is transferred from one power supply apparatus to another power supply apparatus, whereby the power supply apparatus capable of stably transferring the voltage control right is provided.

The processing steps executed by the apparatuses of the present specification may not necessarily be processed chronologically in the order listed in the sequence diagram or the flowchart. For example, the processing steps executed by the apparatuses may be processed in a different order from the order listed in the flowchart or may be processed in parallel.

Furthermore, it is possible to create a computer program that causes hardware such as a CPU, a ROM, and a RAM built in the apparatuses to exhibit the same function as the configuration of each device described above. Furthermore, a storage medium storing such a computer program can be provided. Furthermore, the functional blocks illustrated in the functional block diagram may be configured by hardware to allow a series of processing steps to be implemented by hardware.

Although the preferred embodiments of the present disclosure have been described in detail with reference to the accompanying drawings, the technical scope of the present disclosure is not limited to such examples. It is obvious that persons having ordinary knowledge in the technical field of the present disclosure can conceive various modifications or changes that fall within the scope of the technical idea described in the claims and are naturally understood as belonging to the technical scope of the present disclosure.

For example, the communication line 500 may be wired or wireless. For example, the communication line 500 may be configured by a so-called mesh network. Furthermore, although the communication line 500 and the DC bus line 600 are separately provided in the present embodiment, the present disclosure is not limited to such an example. For example, information indicating power transmission and reception may be superimposed on the DC bus line 600. By superimposing the information indicating the power transmission and reception on the DC bus line 600, it is possible to eliminate the communication line 500 from the power supply system.

Furthermore, the effects described in the present specification are merely illustrative or exemplary, and not limiting. That is, the technology according to the present disclosure can exhibit other effects apparent to those skilled in the art from the description of the present specification, in addition to or instead of the effects described above.

Note that the following configuration also fall within the technical scope of the present disclosure:

(1)

A power control apparatus includes a DC to DC converter connected to a direct current (DC) bus line, a communication unit that communicates with another power control apparatus, and a control unit that controls power interchange with the other power control apparatus via the DC bus line, in which the control unit controls at least a control mode and a droop rate, the control mode includes a first mode controlling a voltage of the DC bus line, a second mode controlling a current flowing through the DC bus line, and a third mode in which the power interchange is stopped, and when the control mode is shifted from the first mode to the second mode or the third mode, the control unit controls the droop rate to be set to a predetermined value other than 0%.

(2)

The power control apparatus according to (1), in which when the control mode is the first mode and the communication unit receives a request for transfer of a control right of the DC bus line from another power control apparatus, the control unit sets the droop rate to a predetermined value other than 0%, while maintaining the control mode in the first mode.

(3)

The power control apparatus according to (2), in which the control unit sets the predetermined value of the droop rate to the same value as a value for the other power control apparatus.

(4)

The power control apparatus according to (2), in which the control unit sets the predetermined value of the droop rate to a value different from a value for the other power control apparatus.

(5)

The power control apparatus according to any one of (2) to (4), in which when it is confirmed that the control mode of the other power control apparatus has changed to the first mode, the control unit switches the control mode to the second mode or the third mode and switches the droop rate to 0%.

(6)

A power control apparatus includes a DC to DC converter connected to a direct current (DC) bus line, a communication unit that communicates with another power control apparatus, and a control unit that controls power interchange with the other power control apparatus via the DC bus line, in which the control unit controls at least a control mode and a droop rate, the control mode includes a first mode controlling a voltage of the DC bus line, a second mode controlling a current flowing through the DC bus line, and a third mode in which the power interchange is stopped, and when the control mode is shifted from the second mode or the third mode to the first mode, the control unit controls the droop rate to be set to a predetermined value other than 0%.

(7)

The power control apparatus as recited in (6), in which when it is confirmed that the communication unit has transmitted a request for transfer of a control right of the DC bus line to the other power control apparatus which has obtained the control right of the DC bus line, and that the other power control apparatus has set the droop rate to the predetermined value other than 0%, the control unit changes the control mode to the first mode, while setting the droop rate to the predetermined value other than 0.

(8)

The power control apparatus according to (7), in which the control unit sets the predetermined value of the droop rate to the same value as a value of the other power control apparatus.

(9)

The power control apparatus according to (7), in which the control unit sets the predetermined value of the droop rate to a value different from a value of the other power control apparatus.

(10)

The power control apparatus according to any one of (7) to (9), in which when it is confirmed that the control mode of the other power control apparatus has changed to the second mode or the third mode, the control unit switches the control mode to the first mode, and switches the droop rate to 0%.

(11)

A power control method causing a processor to execute:

controlling power interchange via a DC to DC converter connected to a direct current (DC) bus line with another power control apparatus through the DC bus line, controlling a control mode including a first mode for controlling a voltage of the DC bus line, a second mode for controlling a current flowing through the DC bus line, and a third mode for stopping the power interchange, and controlling a droop rate of the DC to DC converter, in which when the control mode is shifted from the first mode to the second mode or the third mode, the droop rate is set to a predetermined value other than 0% and then switched to 0%.

(12)

A power control method causing a processor to execute:

controlling power interchange via a DC to DC converter connected to a direct current (DC) bus line with another power control apparatus through the DC bus line, controlling a control mode including a first mode for controlling a voltage of the DC bus line, a second mode for controlling a current flowing through the DC bus line, and a third mode for stopping the power interchange, and controlling a droop rate of the DC to DC converter, in which when the control mode is shifted from the second mode or the third mode to the first mode, the droop rate is set to a predetermined value other than 0% and then switched to 0%.

(13)

A computer program causing a computer to execute:

controlling power interchange via a DC to DC converter connected to a direct current (DC) bus line with another power control apparatus through the DC bus line, controlling a control mode including a first mode for controlling a voltage of the DC bus line, a second mode for controlling a current flowing through the DC bus line, and a third mode for stopping the power interchange, and controlling a droop rate of the DC to DC converter, in which when the control mode is shifted from the first mode to the second mode or the third mode, the droop rate is set to a predetermined value other than 0% and then switched to 0%.

(14)

A computer program causing a computer to execute: controlling power interchange via a DC to DC converter connected to a direct current (DC) bus line with another power control apparatus through the DC bus line, controlling a control mode including a first mode for controlling a voltage of the DC bus line, a second mode for controlling a current flowing through the DC bus line, and a third mode for stopping the power interchange, and controlling a droop rate of the DC to DC converter, in which when the control mode is shifted from the second mode or the third mode to the first mode, the droop rate is set to a predetermined value other than 0% and then switched to 0%.

REFERENCE SIGNS LIST

1 Power supply system
100, 200, 300, 400 Power supply apparatus

The invention claimed is:

1. A first power control apparatus, comprising:
a direct current (DC) to DC converter connected to a DC bus line;
a communication unit configured to communicate with a second power control apparatus; and
a control unit configured to:
control power interchange with the second power control apparatus through the DC bus line;
control at least a control mode of the first power control apparatus or a droop rate of the first power control apparatus, wherein
the control mode includes a first mode to control a voltage of the DC bus line, a second mode to control a current that flows through the DC bus line, and a third mode to stop the power interchange; and
control the droop rate to be set to a value other than 0% based on a shift of the control mode from the first mode to one of the second mode or the third mode.

2. The first power control apparatus according to claim 1, wherein when the control mode is the first mode and the communication unit is configured to receive a request for transfer of a control right of the DC bus line from the second power control apparatus, the control unit is configured to set the droop rate to a value other than 0%, while the control mode maintained in the first mode.

3. The first power control apparatus according to claim 2, wherein the control unit is further configured to set the value of the droop rate same as a value of the second power control apparatus.

4. The first power control apparatus according to claim 2, wherein the control unit is further configured to set the value of the droop rate different from a value of the second power control apparatus.

5. The first power control apparatus according to claim 2, wherein when it is confirmed that the control mode of the second power control apparatus has changed to the first mode, the control unit is further configured to:
switch the control mode to one of the second mode or the third mode; and
switch the droop rate to 0%.

6. A first power control apparatus, comprising:
a direct current (DC) to DC converter connected to a DC bus line;
a communication unit configured to communicate with a second power control apparatus; and
a control unit configured to:
control power interchange with the second power control apparatus via the DC bus line;
control at least a control mode of the first power control apparatus or a droop rate of the first power control apparatus, wherein
the control mode includes a first mode to control a voltage of the DC bus line, a second mode to control a current flowing through the DC bus line, and a third mode to stop the power interchange; and
control the droop rate to be set to a value other than 0% based on a shift of the control mode from one of the second mode or the third mode to the first mode.

7. The first power control apparatus according to claim 6, wherein when it is confirmed that the communication unit has transmitted a request for transfer of a control right of the DC bus line to the second power control apparatus which has obtained the control right of the DC bus line, and that the second power control apparatus has set the droop rate to the value other than 0%, the control unit is further configured to change the control mode to the first mode, while the droop rate is set to the value other than 0.

8. The first power control apparatus according to claim 7, wherein the control unit is further configured to set the value of the droop rate same as a value of the second power control apparatus.

9. The first power control apparatus according to claim 7, wherein the control unit is further configured to set the value of the droop rate different from a value of the second power control apparatus.

10. The first power control apparatus according to claim 7, wherein when it is confirmed that the control mode of the second power control apparatus has changed to one of the second mode or the third mode, the control unit is further configured to:
 switch the control mode to the first mode; and
 switch the droop rate to 0%.

11. A power control method, comprising:
 in a first power control apparatus:
 controlling power interchange via a direct current (DC) to DC converter connected to a DC bus line with a second power control apparatus through the DC bus line;
 controlling a control mode including a first mode for controlling a voltage of the DC bus line, a second mode for controlling a current flowing through the DC bus line, and a third mode for stopping the power interchange; and
 controlling a droop rate of the DC to DC converter to be set to a value other than 0% and then switch to 0% based on a shift of the control mode from the first mode to one of the second mode or the third mode.

12. A power control method, comprising:
 controlling power interchange via a direct current (DC) to DC converter connected to a DC bus line with a second power control apparatus through the DC bus line;
 controlling a control mode including a first mode for controlling a voltage of the DC bus line, a second mode for controlling a current flowing through the DC bus line, and a third mode for stopping the power interchange; and
 controlling a droop rate of the DC to DC converter to be set to a value other than 0% and then switch to 0% based on a shift of the control mode from one of the second mode or the third mode to the first mode.

13. A non-transitory computer-readable medium having stored thereon, computer-executable instructions, which when executed by a first power control apparatus, cause the first power control apparatus to execute operations, the operations comprising:
 controlling power interchange via a direct current (DC) to DC converter connected to a DC bus line with a second power control apparatus through the DC bus line;
 controlling a control mode including a first mode for controlling a voltage of the DC bus line, a second mode for controlling a current flowing through the DC bus line, and a third mode for stopping the power interchange; and
 controlling a droop rate of the DC to DC converter to be set to a value other than 0% and then switch to 0% based on a shift of the control mode from the first mode to one of the second mode or the third mode.

14. A non-transitory computer-readable medium having stored thereon, computer-executable instructions, which when executed by a first power control apparatus, cause the first power control apparatus to execute operations, the operations comprising:
 controlling power interchange via a direct current (DC) to DC converter connected to a DC bus line with a second power control apparatus through the DC bus line;
 controlling a control mode including a first mode for controlling a voltage of the DC bus line, a second mode for controlling a current flowing through the DC bus line, and a third mode for stopping the power interchange; and
 controlling a droop rate of the DC to DC converter to be set to a value other than 0% and then switch to 0% based on a shift of the control mode from one of the second mode or the third mode to the first mode.

* * * * *